United States Patent [19]

Grahe et al.

[11] Patent Number: 5,292,833
[45] Date of Patent: Mar. 8, 1994

[54] THERMOSETTING REACTIVE RESIN MIXTURE, MOULDED ARTICLE AND COATING MADE THEREFROM

[75] Inventors: Gerwald F. Grahe; Arthur Lachowicz; Roland Fromme, all of Berlin, Fed. Rep. of Germany

[73] Assignee: Dainippon Ink and Chemicals, Inc., Tokyo, Japan

[21] Appl. No.: 813,741

[22] Filed: Dec. 30, 1991

[30] Foreign Application Priority Data

Jan. 14, 1991 [DE] Fed. Rep. of Germany ....... 4101158

[51] Int. Cl.$^5$ .......................................... C08F 283/00
[52] U.S. Cl. ................................. 525/531; 525/423; 525/449; 525/510; 525/532; 525/533
[58] Field of Search ............... 525/531, 423, 449, 510, 525/532, 533

[56] References Cited

U.S. PATENT DOCUMENTS

| | | | |
|---|---|---|---|
| 4,122,069 | 10/1978 | Meyer | 525/533 |
| 4,520,167 | 5/1985 | Blank et al. | 525/131 |
| 4,588,783 | 5/1986 | Chang | 525/533 |
| 4,758,632 | 7/1988 | Parekh et al. | 525/328.2 |
| 4,897,435 | 1/1990 | Jacobs, III et al. | 525/523 |

FOREIGN PATENT DOCUMENTS

| | | |
|---|---|---|
| 0245483 | 11/1987 | European Pat. Off. . |
| 0302222A2 | 2/1989 | European Pat. Off. . |
| 0305794A2 | 8/1989 | European Pat. Off. . |
| 2028352 | 12/1970 | Fed. Rep. of Germany . |
| WO-A-8907123 | 10/1989 | PCT Int'l Appl. . |

OTHER PUBLICATIONS

Chem. Abstr. 100, 105162r.
Chem. Abstr. 106, 51724d.
Chem. Abstr. 112, 140593b.
Derwent-Abstr. 89-327 655/45 zu JP01242564.

*Primary Examiner*—John C. Bleutge
*Assistant Examiner*—Randy Gulakowski
*Attorney, Agent, or Firm*—Armstrong, Westerman, Hattori, McLeland & Naughton

[57] ABSTRACT

The invention relates to a thermosetting reactive resin mixture of
- a) at least one organic compound, which possesses at least two epoxide groups,
- b) at least one carbamate compound of the formulae I, II, III or IV, such as can be quoted from the claim petitions,
- c) at least one basic catalyst, and with or without
- d) other processing aids and/or additives.

The thermosetting reactive resin mixture according to the present invention are used for chemically resistant coatings, as cross-linked, no longer soluble and infusible moulded articles, for the production of cathodically precipitable electrophoretic enamels, and for the production of coating powders and automobile paints.

23 Claims, No Drawings ically harden by the reaction between hydroxy-func-
THERMOSETTING REACTIVE RESIN MIXTURE, MOULDED ARTICLE AND COATING MADE THEREFROM

BACKGROUND OF THE INVENTION

The invention relates to thermosetting reactive resin mixtures and moulded articles and coatings made therefrom.

Large numbers of thermosetting resin mixtures, which form cross-linked systems at raised temperatures, are known.

Paint binders, which contain carbamate groups—especially hydroxyalkyl carbamate derivatives—are likewise known and are relatively often used.

In such cases the function of the carbamate compounds used is quite varied.

Thus many binders for coatings, which contain low molecular weight hydroxyalkyl carbamates have been described. For example, such systems are the object of U.S. Pat. No. 4,520,167, EP 212 380, EP 302 222, WO 87/00851 and WO 88/02766. Similar thermosetting mixtures are described by W J Blank (J Coat. Technol. 60, (1988) No. 764, 43 and Proc. Water-Borne Higher Solids Coatings Symp. New Orleans, 1989, 332). All the stated publications concern paint binders which essentionalised polymers and amine resin or isocyanate cross-linkers; the low molecular weight hydroxyalkyl carbamates used are only used as reaction diluents and do not take part in the actual cross-linking reaction.

Another group of carbamate-containing binders are the polyfunctional hydroxyalkyl carbamates, which also fall within the known state of technology. In such binders, the hydroxyalkyl urethane function is linked to a polymeric system. This chiefly relates to:

a) Modified amine resins or mixtures with melamine resins (e.g. EP 152 820, EP 245 700, EP 245 701, EP 246 483, EP 257 848), b) Acrylic resins with at least two hydroxyalkyl carbamate groups (e.g. EP 152 820, U.S. Pat. No. 4,758,632), c) Polyfunctional hydroxyethyl carbamates based on amidoamines (e.g. U.S. Pat. No. 4 588 783), d) Modified epoxyresins (e.g. EP 119 769, DE-OS 3 311 517, DE-OS 3 311 518, U.S. Pat. No. 4 484 994).

All of the hydroxyalkyl carbamates of this group are used as activated hydroxy-functionalised polymers. At high temperature they cross-link with normal amine resin cross-linkers, e.g. with melamine resins. With suitable catalysts these resins are also capable of self-cross-linking.

In hardening paint systems, similar functions are performed by hydroxyalkyl urethanes derived from low molecular weight di- or polyamines and ethylene or propylene carbonate (e.g. V V Mikheev et al., Lakokras. Mater. Ikyh Primenen. 1983, No. 6, 5; G G Parekh, Proc. Water-Borne Higher-Solids Coatings Symp. New Orleans, 1987, 492), which are also used for cross-linking with polyfunctional hydroxycompounds.

It is also known that carbamates can react with epoxy groups. Y Iwakura and S Izawa describe reactions of N-aryl urethanes with arylglycidyl ethers (J Org. Chem. 29, (1964) 379; J Polym. Sci. A-14, (1966) 751). With the use of bifunctional starting compounds, linear polymers can be prepared. After a number of attempts, it had to be stated that N-alkyl carbamates do not undergo this reaction.

Linear polymers from bifunctional epoxides and bifunctional carbamates were obtained by Z N Pazenko et al. (Sintez i fizikochimija polimerow 7, (1970) 42; 8, (1971) 45) In these cases also, N-aryl carbamates were used. The polymers obtained have low molecular weights, melt easily and dissolve well in most polar solvents.

The same authors also state (Sintez i fizikochimija polimerow 6, (1970) 42), that under severe reaction conditions (ca. 1-2 hours at ca. 160° C.) unsubstituted aliphatic carbamates can also be made to react with epoxides. In the process readily melting and easily soluble—therefore linear—polymers with low molecular weight are likewise obtained.

Cross-linking systems from hydroxyethyl urethanes and epoxy resins were obtained by G Rokicki and R Lazinski (Angew. Makromol. Chem. 170 (1989) 211). Here epoxides were cross-linked with aliphatic polyamines (e.g. triethylenetetramine), which were partially modified with cyclic carbonates. The modified polyamines contain hydroxyethyl urethane groups, however also at the same time adequate amounts of reactive aliphatic H-N-functions, through which the actual cross-linking reaction proceeds—at room temperature. This case involves classical epoxide hardening by aliphatic polyamines: the hydroxyalkyl urethane groups serve only to improve the properties of the products obtained, without strictly speaking being involved in the cross-linking reaction.

Attempts to prepare three-dimensional networks from polyfunctional epoxides (epoxyacrylates) and bifunctional hydroxyalkyl carbamates are described by V V Mikheev et al. (Lakokras. Mater. Ikh Primenen. (1987), No. 5, 13; (1987), No. 6, 26). It seems that here one is dealing with a reaction between the epoxy groups and the hydroxyurethane functions, since the resulting products are cross-linked. However, the cross-linking reaction—which is catalysed by organotin compounds—requires high temperatures of ca. 160° to 180° C. and quite long reaction times (up to 2 hours or more). Under these very severe conditions, undesired decomposition processes of the polymeric system, e.g. a marked yellowing in the case of stoving enamels, are often observed.

The known state of technology therefore offers no convenient possibility for the production of cross-linked systems from epoxide resins and carbamates, in particular hydroxyalkyl urethanes or derivatives thereof.

SUMMARY OF THE INVENTION

The purpose of the present invention is to eliminate this disadvantage of the state of technology and to develop a new kind of reactive resin mixture capable of cross-linking on heating, which consist of epoxides and carbamates, especially hydroxyalkyl carbamates, and can be used for production of moulded articles, or as organically dissolved or water dissolved or emulsified stoving enamels or powder enamels.

The object of the present invention is to provide thermosetting reactive resin mixtures consisting of a) at least one organic compound, which possesses at least two epoxide groups, b) at least one carbamate compound of the general formula I,

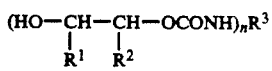   I wherein
- $R^1$, $R^2$ mean a hydrogen atom or an optionally substituted methyl group,
- $R^3$ means a hydrogen atom, an optionally substituted methyl group or a di- or trivalent aliphatic, cycloaliphatic, aromatic or heterocyclic residue with at most 20 carbon atoms,
- n means 1, 2 or 3, c) at least one basic catalyst, and with or without
d) other processing aids and/or additives.

A further object of the invention is to provide thermosetting reactive resin mixtures of a) at least one organic compound, which possesses at least two epoxide groups, b) at least one carbamate compound of the general formula II,

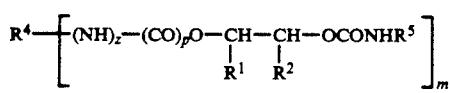   II wherein
- $R^1$, $R^2$, $R^5$ mean a hydrogen atom or an optionally substituted methyl group,
- $R^4$ means a hydrogen atom, a mono-, di-, tri- or tetravalent optionally substituted aliphatic, cycloaliphatic, aromatic or heterocyclic residue with at most 20 carbon atoms,
- p means 0 or 1,
- z, means 0 or 1, provided that p is greater than or equal to z,
- m means 1, 2, 3 or 4, c) at least one basic catalyst, and with or without
d) other processing aids and/or additives.

Also objects of the invention include providing thermosetting reactive resin mixtures of a) at least one organic compound, which possesses at least two epoxide groups, b) at least one acrylate copolymer of the general formula III containing at least 2 carbamate groups on average per macromolecule,

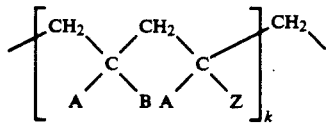   III wherein
- A means $R^6$, $COOR^6$ or $CH_2COOR^6$,
- $R^6$ means a hydrogen atom or an alkyl residue with at most 18 carbon atoms,
- B means

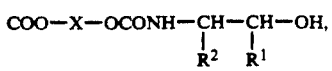

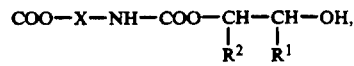

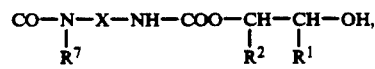

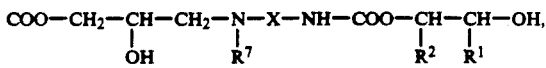

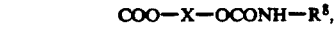

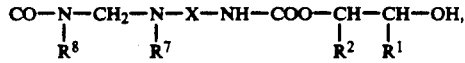

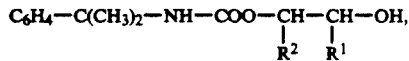

or

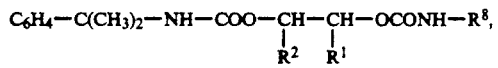

X means a divalent aliphatic, cycloaliphatic, aromatic or etheraliphatic residue with at most 20 carbon atoms, $R^7$ means a hydrogen atom, an aliphatic, cycloaliphatic or aromatic residue with at most 12 carbon atoms, optionally substituted with a further HO-group and/or

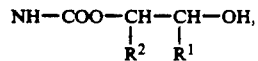

$R^8$, $R^9$ mean a hydrogen atom or an optionally substituted methyl group,

Z means $COOR^6$, $C\equiv N$, $COO-X-N(R^6)_2$, $COO-X-OH$, $CO-NH_2$,

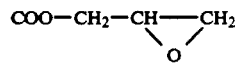

or optionally alkyl-substituted phenyl groups,
k means 5 to 200, and
$R^1$ and $R^2$ have the meaning previously stated,
c) at least one basic catalyst and with or without
d) other processing aids and/or additives.

Also objects of the invention are thermosetting reactive resin mixtures of a) at least one organic compound which has at least two epoxide groups, b) at least one polymer of the general formula IV,

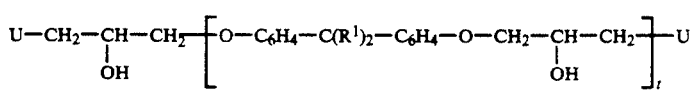   IV wherein
U means

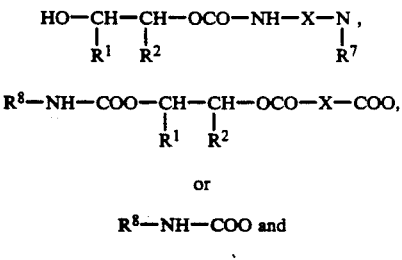

R⁸—NH—COO—CH—CH—OCO—X—COO,
         |    |
         R¹   R² or

R⁸—NH—COO and t means 2 to 10, and
R¹, R², R⁷ and X have the meaning previously stated,
c) at least one basic catalyst and with or without
d) other processing aids and/or additives.

Also objects of the invention are cross-linked, no longer soluble and infusible moulded articles, which are obtained from the thermosetting reactive resin mixtures of the invention by heating to temperatures up to 300° C. with previous or simultaneous moulding.

A further object of the invention also is to provide cross-linked chemical-resistant coatings, which are obtained from the thermosetting reactive resin mixtures of the invention after previous application to the objects to be coated by stoving at temperatures between 80° C. and 240° C., preferably between 100° C. and 180° C., especially between 20° C. and 160° C.

DETAILED DESCRIPTION OF THE INVENTION

The organic compounds possessing at least two epoxide groups to be used according to the invention can on the one hand be low molecular weight polyfunctional epoxides, e.g. glycidyl ethers of mono- or polyfunctional alcohols or phenols, such as 1,2-ethylene glycol diglycidyl ether, 1,2- or 1,3-propylene glycol diglycidyl ether, 1,2-, 1,3- or 1,4-butanediol diglycidyl ether, neopentyl glycol diglycidyl ether, hexylene glycol diglycidyl ether, dimethylcyclohexanediol diglycidyl ether, glycerol triglycidyl ether, trimethylolpropane triglycidyl ether, pentaerythritol triglycidyl ether, pentaerythritol tetraglycidyl ether, dibromoneopentyl diglycidyl ether, sorbitol glycidyl ether, resorcinol diglycidyl ether, pyrocatechol diglycidyl ether, hydroquinone diglycidyl ether, bisphenol A diglycidyl ether, bisphenol F diglycidyl ether, bisphenol S diglycidyl ether, glycidyl esters of polyfunctional carboxylic acids such as diglycidyl adipate, diglycidyl sebacate, diglycidyl phthalate, aliphatic or cycloaliphatic epoxides such as butadiene diepoxide, vinylcyclohexene diepoxide, 3,4-epoxycyclohexylmethyl-(3,4-epoxy)-cyclohexane carboxylate (Degacure K 126, Degussa), homo- or copolymers of epoxide-containing monomers such as glycidyl acrylate, glycidyl methacrylate, diglycidyl itaconate, alkylmonoglycidyl itaconate, alkylmonoglycidyl maleate, glycidyl crotonate, butadiene monoepoxide, vinylcyclohexene epoxide, vinylstyrene epoxide, di- or triglycidyl ethers of oligomeric di- or triols such a polyoxypropylene diglycidyl ether, polyoxypropylene triglycidyl ether, polytetramethylene oxide diglycidyl ether, triglycidyl isocyanurate or polyglycidyl isocyanurate, aromatic glycidylamine derivatives such as diglycidylaniline, tetraglycidyldianiline.

Polymeric substances with on average at least two epoxide groups per macromolecule can also preferably be used according to the present invention, e.g. usual condensation resins from epichlorhydrin and bisphenyl A, F or S, epoxyphenol novolaks, epoxybisphenol novolaks, polypropylene oxide diglycidyl ether, polytetramethylene oxide diglycidyl ether, polyoxypropylene triglycidyl ether, cycloaliphatic epoxide resin Degacure K 126 (Degussa).

As carbamate compounds of the general formula I, according to the present invention reaction products of organic isocyanates with 1,2-glycols can be used. As isocyanates, substances with quite diverse structure can be used for this, e.g. isocyanic acid, monofunctional aliphatic isocyanates such as methyl isocyanate, ethyl isocyanate, propyl isocyanate, butyl isocyanate or cyclohexyl isocyanate, aromatic monoisocyanates such as phenyl isocyanate, naphthyl isocyanate or substituted phenyl or naphthyl isocyanates, aliphatic diisocyanates such as tetramethylene diisocyanate, hexamethylene diisocyanate, isophorone diisocyanate, 2,4,4-trimethylhexamethylene diisocyanate, cyclohexane diisocyanate or hydrogenated diphenylmethane diisocyanate, aromatic diisocyanates such as phenylene diisocyanate, toluylene diisocyanate, diphenylmethane diisocyanate, naphthalene diisocyanate or triphenylmethane triisocyanate.

However conversion products of the polyfunctional isocyanates, which after the conversion still possess isocyanate groups, such as e.g. trimerised hexamethylene diisocyanate, di- or trimerised isophorone diisocyanate, biuret-modified hexamethylene diisocyanate, toluylene diisocyanate isocyanurate, toluylene diisocyanate trimethylolpropane adduct etc can also advantageously be used for the preparation of carbamate compounds of the general formula I.

In the reaction of the said mono or polyfunctional isocyanates with glycols, during which carbamate compounds of the general formula I are produced, many 1,2-glycols can be used. The following can serve as examples of especially suitable compounds: ethylene glycol, 1,2-propylene glycol, 1,2-butylene glycol, 1,2-hexylene glycol, 3-chloro-1,2-propandiol, 1-phenoxy-2,3-propandiol, phenylethylene glycol, 1-allyloxy-2,3-propandiol, 1-butoxy-2,3-propandiol, glycerine monocarboxylates, such as 1-acetoxy-2,3-propandiol, 1-methacryloxy-2,3-propandiol etc.

Particularly suitable in use according to the present invention as carbamate compounds of the general formula I are reaction products from ammonia, or mono-, di- or trifunctional aliphatic, aromatic or heterocyclic amines with 5-membered cyclic esters of carbonic acid. In this reaction the most diverse dioxolanones, such as e.g. ethylene carbonate, propylene carbonate, 1,2-, or 2,3-butylene carbonate, phenylethylene carbonate, can be used as cyclic carbonates. For this, it is particularly advantageous to use cyclic carbonates which can be made from the corresponding 1,2-epoxides by catalytic addition of carbon dioxide, e.g. butyloxymethylethylene carbonate, phenoxymethylethylene carbonate, allyloxymethylethylene carbonate, glycerine cyclocarbonate methacrylate, chloromethylethylene carbonate, cyclocarbonate derived from Cardura E 10 and $CO_2$, etc.

The selection of amines which on reaction with cyclic carbonates can give carbamate compounds of the general formula I is also really large. Particularly advantageously it is possible to use ammonia, aliphatic amines such as methylamine, ethylamine, propylamine, butylamine, cyclohexylamine, ethylenediamine, propylenediamine, butylenediamine, hexamethylenediamine, isophorone diamine, 2,2,4-trimethyl hexamethylenediamine, dodecane diamine, hydrogenated diphenylmethanediamine, phenylenediamine, toluylenediamine, diphenylmethane diamine, ethyl polyamines such as 4,9-dioxadodecan-1,12-diamine, 4,7,10-trioxatridecane-1,13-diamine, bis(3-aminopropyl)polytetrahydrofuran, Jeffamine (proprietory product of Texaco Co.), amidoamines, such as bis-(2-aminoethyl)adipamide, bis-(2-aminoethyl)-sebacamide etc.

The use of mixtures of two or more carbamates, which are prepared according to the same or different methods, but all possess the general formula I, can be especially advantageous in the present invention.

As carbamate compounds of the general formula I primary or secondary carbamates can preferably be used, e.g.

HOCH$_2$CH$_2$—OCONH$_2$, HOCH$_2$—CH(CH$_3$)—OCONH$_2$, HOCH(CH$_3$)—CH$_2$—OCONH$_2$, HOCH$_2$CH$_2$—OCONHC$_2$H$_5$, HOCH$_2$CH$_2$—OCONHCH$_3$, C$_6$H$_5$OCH$_2$—CH(OH)—CH$_2$—OCONH$_2$, HOCH(CH$_3$)—CH$_2$—OCONH—(CH$_2$)$_6$—NHCOO—CH$_2$CH(CH$_3$)OH, C$_6$H$_5$OCH$_2$—CH(OH)—CH$_2$—OCONH—(CH$_2$)$_4$—NHCOO—CH$_2$CH(OH)—CH$_2$OC$_6$H$_5$.

As carbamate compounds of the general formula II, many esters or urethanes of the hydroxycarbamates of the formula HO—CH(R$^1$)—CH(R$^2$)—OCONHR$^3$, i.e. carbamate compounds of the general formula I, where n=1, to be regarded as alcohols, can be used.

These may be derivatives of mono-, di- or tri-functional acids or isocyanates.

Particularly well suited as esters (z=0 in the general formula II) are formates, acetates, propionates, acrylates, methacrylates, crotonates, maleates, itaconates, benzoates, phenylacetates, phthalates, trimellitates, pyromellitates and cinnamates, e.g.

C$_6$H$_5$—CH=CH—COO—CH(CH$_3$)—CH$_2$—OCONH$_2$.

Particularly well suited as urethanes (z=1, p=1 in the general formula II) are derivatives of monoisocyanates, such as methyl isocyanate, ethyl isocyanate, butyl isocyanate, hexyl isocyanate, cyclohexyl isocyanate, phenyl isocyanate, substituted phenyl isocyanates, benzyl isocyanate, naphthyl isocyanate, or even polyfunctional isocyanates, such as 1,4-tetramethylene diisocyanate, 1,6-hexamethylene diisocyanate, isophorone diisocyanate, 2,2,4-trimethylhexamethylene diisocyanate, 1,4-phenylene diisocyanate, toluylene diisocyanate, diphenylmethane diisocyanate or naphthalene diisocyanates, e.g.

CH$_3$—NHCOO—CH$_2$CH$_2$—OCONH$_2$, C$_4$H$_9$—NHCOO—CH$_2$CH$_2$—OCONH-C$_2$H$_5$, C$_6$H$_{11}$—NHCOO—CH(CH$_3$)—CH$_2$—OCONH$_2$, C$_6$H$_5$—NHCOO—CH$_2$CH$_2$—OCONH$_2$, C$_6$H$_5$CH$_2$—NHCOO—CH(CH$_3$)—CH$_2$—OCONH—CH$_3$, H$_2$NCOO—CH$_2$CH$_2$—OCONH—(CH$_2$)$_4$—NHCOO—CH$_2$CH$_2$—OCONH$_2$, CH$_3$—NHCOO—CH(CH$_3$)—CH$_2$—OCONH—C$_6$H$_4$—NHCOO—CH$_2$—CH(CH$_3$)—OCONH—CH$_3$, H$_2$NCOOCH$_2$CH$_2$—OCONH—CH$_2$C(CH$_3$)$_2$CH$_2$CH(CH$_3$)CH$_2$CH$_2$—NHCOO—CH$_2$CH$_2$OCONH$_2$.

However conversion products of the polyfunctional isocyanates, which after conversion still possess free isocyanate groups, such as e.g. trimerised hexamethylene diisocyanate, di- or trimerised isophorone diisocyanate, biuret-modified hexamethylene diisocyanate, toluylene diisocyanate isocyanurate, toluylene diisocyanate-trimethylol propane adduct etc can advantageously be used for the preparation of carbamate compounds of the general formula II, e.g.

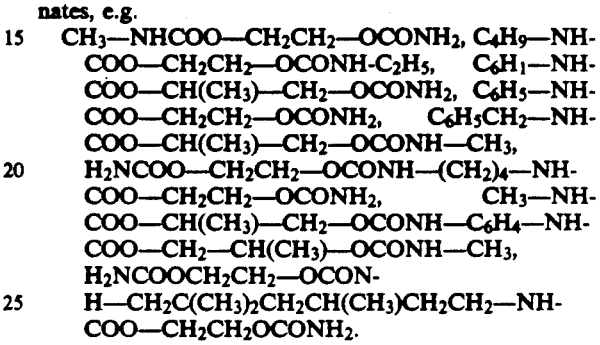

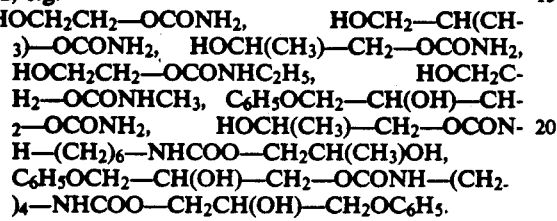

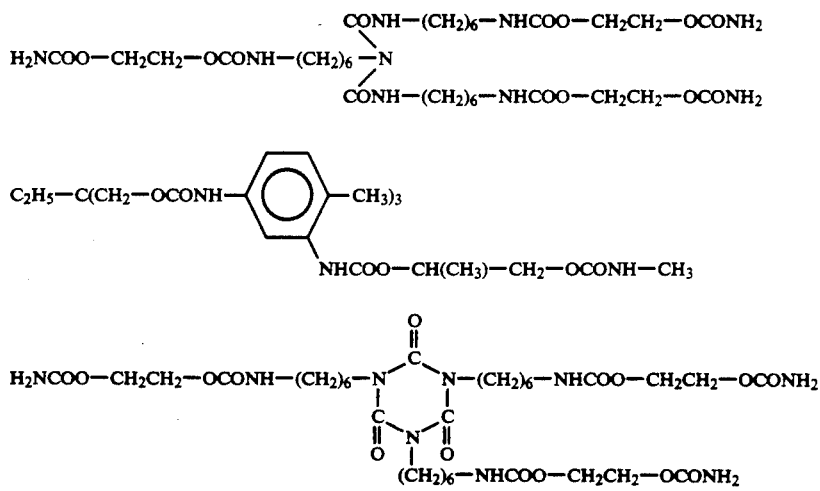

HCOO—CH$_2$CH$_2$—OCONH$_2$,
CH$_3$—COO—CH$_2$CH$_2$—OCONH$_2$,
CH$_3$—COO—CH$_2$CH$_2$—OCONH—CH$_3$,
C$_2$H$_5$—COO—CH(CH$_3$)—CH$_2$—OCONH—CH$_3$,
CH$_2$=C(CH$_3$)—COO—CH$_2$CH$_2$—OCONH$_2$,
CH$_2$=CH—COO—CH$_2$—CH(CH$_3$)—OCONH$_2$,
CH$_3$—CH=CH—COO—CH(CH$_3$)—CH$_2$—OCONH$_2$, CH$_2$=C(COOH)CH$_2$COO—CH$_2$CH$_2$—OCONH$_2$,
C$_6$H$_5$—COO—CH$_2$CH$_2$—OCONH—C$_2$H$_5$,
HOOC—C$_6$H$_4$—COO—CH$_2$CH$_2$—OCONH$_2$,

The acrylate polymers according to the general formula III are copolymers of:

a) at least one urethane-containing monomer, such as esters or amides of acrylic acid, methacrylic acid, itaconic acid, crotonic acid, maleic acid, e.g.

CH$_2$=CH—COO—CH$_2$—CH(CH$_3$)—OCONH$_2$,
CH$_2$=C(CH$_3$)—COO—CH$_2$CH$_2$—OCONH$_2$,
CH$_3$—CH=CH—CONH—CH$_2$CH$_2$—NHCOO—CH$_2$CH$_2$—OH, CH$_2$=C(COOH)CH$_2$COO—CH(CH$_3$)—CH$_2$—OCONH—CH$_3$,
CH$_2$=C(CH$_3$)—CONH—CH$_2$—O—CH$_2$CH$_2$—OCONH$_2$, CH$_2$=C(CH$_3$)—COO—CH$_2$C-

H₂—NHCOO—CH₂—CH(CH₃)—OCONH₂,
CH₂=C(CH₃)—COO—CH₂CH₂—OCONH—(CH₂)₆—NHCOO—CH₂CH₂—OCONH—CH₃ and/or at least one urethane-containing derivative of styrene or alpha-methylstyrene, e.g.

CH₂=C(CH₃)—C₆H₄—C(CH₃)₂—NH-COO—CH₂CH₂—OH, CH₂=C(CH₃)—C₆H₄—C(CH₃)₂—NHCOO—CH(CH₃)—CH₂—OCONH-CH₃ b) at least one compound from the group of the usual monomers used in the preparation of acrylic resins, such as acrylic or methacrylic acid, optionally substituted acrylic or methacrylic esters, amides, nitriles, styrene, vinyltoluene and others, e.g.

CH₂=CH—C₆H₅, CH₂=CH—COOH,
CH₂=C(CH₃)—CONH₂, CH₂=CH—CN,
CH₂=C(CH₃)—COOCH₃,
CH₂=C(CH₃)—COOCH₂CH₂—N(CH₃)₂,
CH₂=CH—COOC₄H₉, CH₂=C(COOC₂H₅)CH₂COOC₂H₅.

The copolymers according to general formula III are preferably prepared by radical copolymerisation. Especially well suited as initiators of the polymerisation are the known peroxide compounds, such as dialkyl peroxides, alkyl hydroperoxides, diacyl peroxides or esters of the peroxycarboxylic acids, the known azo initiators or the usual redox initiator systems. Several substances of the stated substance classes are well known as polymerisation initiators (e.g. F Runge and E Taeger "Introduction to the Chemistry and Technology of Plastics", Akademie-Verlag Berlin, 1976).

The preparation of the copolymers of the general formula III can be carried out in various ways. Particularly suitable are the methods of substance or bulk polymerisation, solution, suspension or emulsion polymerisation.

In the preparation of the acrylate copolymers of the general formula III by solution polymerisation, known substances are used as solvents. Especially suitable for this are such solvents as hydrocarbons (e.g. heptane, toluene, xylenes), esters (e.g. ethyl or butyl acetate, ethyl propionate), alcohols (e.g. butanol), ketones (e.g. methyl ethyl ketone, methyl isobutyl ketone), ethers (e.g. tetrahydrofuran, dioxan, ethylene glycol dimethyl, or diethyl ether, diethylene glycol dimethyl or diethyl ether), alkylglycols (e.g. methylglycol, ethylglycol, butylglycol, methyldiglycol) or glycol ether esters (e.g. ethylglycol acetate, butyldiglycol acetate, methoxypropyl acetate). Both the individual solvents and also mixtures thereof can advantageously be used in the polymerisation. The initiation of the polymerisation is effected with generally known radical generators. The polymerisation for the preparation of the copolymers of the general formula III can be performed over a broad temperature range, it being advantageous to work in the temperature range between 60° C. and 180° C., and particularly beneficial in the temperature range between 80° C. and 140° C. During the polymerisation the decomposition temperature of the particular carbamate used (generally ca. 140° C. to 180° C.) should not be exceeded.

The preparation of the copolymers of the general formula III can also be effected by emulsion polymerisation. This mode of operation is especially preferred when it is desired to prepare thermosetting reactive resin mixtures according to the invention. Here, use is made of normal, generally known polymerisation additives frequently used in emulsion polymerisation, for example emulsifiers, water-soluble or water-insoluble polymerisation initiators, emulsion stabilisers, chain length regulators, buffer systems, cross-linking agents, defoamers or preservatives.

The preparation of the copolymers of the general formula III by emulsion polymerisation can be effected either in the presence or the absence of emulsifiers. Suitable for this are many generally known emulsifiers (e.g. I Piirma (Ed.) Emulsion Polymerisation, Academic Press, 1982, 221-245), which can be either cationic, anionic or even non-ionic in nature.

The quantities of the individual reaction components in the preparation of the copolymers of the general formula III by emulsion polymerisation can be varied over a wide range, so that the polymer content of the emulsions obtained lies between 5 and 85 wt %, advantageously between 30 and 60 wt %.

The preparation of the copolymers of the general formula III by emulsion polymerisation can be effected over a wide temperature range. Depending on the activity of the initiator system used and of the emulsifier or emulsifier mixture used, the emulsion polymerisation can take place between 0° C. and 100° C., preferably between 20° C. and 80° C. Addition of small quantities of organic solvents can have an advantageous effect on the emulsion polymerisation for the preparation of the copolymers of the general formula III, especially during the subsequent use of the aqueous emulsions obtained for the preparation of the thermosetting reactive resin mixtures according to claim 3 and in the use of these reactive resin mixtures according to the invention in the coatings or paints sector.

A variant of the preparation of copolymers of the general formula III of particular interest in relation to the subsequent use of the thermosetting reactive resin mixtures according to the invention is that whereby, together with one or more carbamate-containing monomers and other monomers normally useable in emulsion polymerisation in water, substances of basic or acidic character (e.g. substituted aminoalkyl acrylates, unsaturated acids, vinylpyridine, etc) are polymerised in. In this way storage-stable aqueous emulsions can be prepared, which contain copolymers of the general formula III and can be used for the preparation of the thermosetting reactive resin mixtures according to claim 3 of the invention in aqueous emulsion. The binders present in these emulsions—after complete or partial neutralisation—are electrically precipitable and can be used for the preparation of electrophoretic enamels.

The molecular weight of the acrylic copolymers according to the general formula III can be regulated by known methods, especially by the use of regulators. Especially suitable are known regulators based on mercaptans, such as dodecylmercaptans, mercaptoethanol, and derivatives of mercaptoacetic or mercaptopropionic acid.

The polymers of the general formula IV are reaction products from epoxy resins and reactive carbamate compounds, which in addition to the urethane groups also possess in addition a primary or secondary amine group or a carboxyl function. These carbamate compounds are readily accessible by the reaction of aliphatic polyamines with stoichiometric proportions or a lesser proportion of 2-oxo-1,3-dioxolanes, based on the primary amine groups. Examples are the following products $H_2N-CH_2CH_2NHCOO-CH_2CH_2-OH$,
$HO-CH_2CH_2NH-CH_2CH_2-NH-COO-CH(CH_3)CH_2-OH$, $H_2N-(CH_2)_6-NH-COO-CH_2-CH(CH_3)-OH$.

Carbamates which as well as the urethane function carry a carboxyl group can very easily be synthesised by the reaction of hydroxyalkyl carbamates of the general formula I (where n=1) with a cyclic dicarboxylic acid anhydride. In this way compounds such as the following are formed $H_2NCOO-CH_2CH_2-OCOCH_2CH_2-COOH$,
$HOOC-C_6H_4-COOCH(CH_3)CH_2-OCONH_2$,
$HOOC-(CH_2)_3-COO-CH_2CH_2-OCONH-CH_3$.

These reactive carbamate compounds are linked to the epoxide groups of the epoxide resins via the amine or carboxyl function. The reaction of the amine groups with the oxirane function here proceeds readily at room temperature, while the reaction between carboxyl and epoxide groups requires an elevated temperature and the use of known catalysts (e.g. amines, quaternary ammonium salts, phosphines, Lewis acids etc). The polymers of the general formula IV formed in the reactions have for example the following structure:

$HO-CH_2CH_2OCONH-CH_2CH_2-N(CH_2CH_2OH)CH_2CH(OH)CH_2O-C_6H_4-C(CH_3)_2-C_6H_4-OCH_2CH(OH)CH_2N(CH_2CH_2OH)CH_2CH_2-NHCOO-CH_2CH_2-OH$ $[CH_3-NHCOO-CH_2CH_2-OCOCH_2CH_2CH_2COOCH_2CH(OH)CH_2O-C_6H_4-]_2-C(CH_3)$hd CH_3
$NHCOO-CH_2CH_2-OCOCH_2C$
$H_2CH_2COOCH_2C$
$H(OH)CH_2-[O-C_6H_4-C(CH_3)_2-C_6H_4-OCH_2CH(OH)CH_2O-]_{1-10}COCH_2CH_2C$
$H_2-COOCH_2CH_2-OCONH-CH_3$.

A further group of polymers of the general formula IV is represented by the products of the reaction of polymers containing terminal dioxolanone groups (obtained from epoxide resins for example according to DE-OS 35 29 263, or DE-OS 37 23 782) with ammonia or amines. The polymers of the general formula IV thus formed have for example the following structure:

$H_2NCOO-CH_2CH(OH)CH_2-[O-C_6H_4-C(CH_3)_2-C_6H_4-OCH_2CH(OH)-CH_2O-]_{1-10}-CONH_2$
$CH_3NHCOOCH_2CH(OH)CH_2-[O-C_6H_4C(CH_3)_2-C_6H_4-OCH_2CH(OH)-CH_2O-]_{1-10}-CONHCH_3$.

For the preparation of thermosetting reactive resin mixtures according to the invention, the use of basic catalysts is necessary. Advantageously aliphatic amines can be used for this, such as for example ethylhexylamine, dibutylamine, triethylamine, tributylamine, triethanolamine, heterocyclic amines such as 1,4-diazabicyclo-(2,2,2)-octane, 4-(dimethylamino)-pyridine, imidazoles, such as 2-ethyl-4-methylimidazole, amidines, such as 1,5-diaza-bicyclo(4,3,0)-non-5-ene, 1,8-diazabicyclo(5,4,0)-undec-7-ene, guanidines, such as 1,1,3,3-tetramethylguanidine, quaternary ammonium compounds such as tetramethylammonium hydroxide, benzyltrimethylammonium hydroxide, tetraethylammonium fluoride, benzyl triethylammonium chloride, tetraethylammonium iodide, hydroxides and alcoholates of the alkali metals, such as sodium hydroxide, sodium methoxide, potassium tert.-butylate etc. It can also be advantageous to use mixtures of two or of several suitable catalysts.

The cross-linking taking place in the thermosetting reactive resin mixtures according to the invention at increased temperature relies on a reaction between the oxirane groups of the epoxide compounds used and the urethane groups of the carbamates used of the general formulae I, II, III or IV. In order to cause this cross-linking reaction to occur in the thermosetting reactive resin mixtures, it is necessary that both reactive components—the epoxide and the carbamate compound(s)—are present in a defined quantity ratio. Here it is exclusively the mole ratio of the reacting groups which is important. The reactive resin mixtures according to the invention can easily be thermally set when the mole ratio of the carbamate/oxirane reactive groups is between 20:1 and 1:20, advantageously between 5:1 and 1:5, preferably between 3:1 and 1:3 and especially between 2:1 and 1:2.

The thermosetting reactive resin mixtures according to the present invention essentially consist of:
at least one organic compound possessing at least 2 epoxide groups
at least one carbamate compound of the general formulae I, II, III or IV and
at least one basic catalyst.

The thermosetting reactive resin mixtures according to the invention are prepared by mixing of these three components, if necessary with heating to temperatures up to ca. 120° C. In many cases—particularly when low molecular weight epoxide compounds are used—no compatibility problems of any kind are observed, so that the said components can be mixed as such. In this way mixtures which are solvent-free are obtained.

The mixtures obtained are clear and homogeneous; their viscosity mainly depends on the melting or softening temperatures of the components used. Above the softening temperature, the mixtures are in most cases of relatively low viscosity.

A mixture of the said components in suitable quantity ratios also forms a thermosetting reactive resin mixture according to the present invention without the use of further additives.

In relation to application technology considerations, it can however be advantageous to use processing aids and/or additives when using the reactive resin mixtures according to the invention. These can be such substances as solvents, reinforcing materials, levelling agents, light stabilisers, dyestuffs, pigments, pigment pastes, fillers, plasticisers, fragrances or flavourings, bactericides, fungicides, antioxidants, stabilisers, anti-corrosion agents, propellants, surfactants, thickeners, reactive diluents and neutralising substances etc. These additives, which are for example very well-known and frequently used in the paint industry, can if necessary be added to the reactive resin mixtures of the invention directly before processing.

Suitable fillers which may be mentioned are: chalk, talc, kaolin, powdered quartz, slate flour, silicic acids, aluminium oxides etc.

Suitable plasticisers are for example dioctyl phthalate, dioctyl adipate, dibutyl sebacate, triphenyl phosphate etc.

The simultaneous use of reinforcing materials during the processing of the reactive resins according to the invention is also possible. As examples of such materials, glass fibers or glass fabric may be cited.

As dyestuffs or pigments, which can be of an inorganic or organic nature, the following are named for example: titanium dioxide, soot, zinc chromate, barium chromate, lead chromate, zinc oxide, iron oxide pigments, phthalocyanine pigments, ultramarine blue, naphthol red, etc.

The thermosetting reactive resin mixtures according to the invention can be diluted with a solvent. In this way the compatibility problems occurring in some cases with the resin mixtures of the invention can be overcome; secondly in this way the processing technology properties can be improved, e.g. the viscosity of a paint formulation can be decreased or the flow of the applied paint improved.

Many solvents can be added to the thermosetting reactive resin mixtures according to the present invention. Particularly suitable for this are aliphatic or aromatic optionally halogen-substituted hydrocarbons such as methylene chloride, chloroform, carbon tetrachloride, dichloroethane, hexane, cyclohexane, benzene, toluene, xylenes, chlorobenzene, dichlorobenzenes, technical solvent mixtures such as petrol fractions, aromatics mixtures (Solvesso or Shellsol types), ethers such as diethyl ether, ethylene glycol dimethyl ether, ethylene glycol diethyl ether, diethylene glycol dimethyl ether, dipropylene glycol diethyl ether, tripropylene glycol dimethyl ether, tetrahydrofuran, dioxane, ketones, such as acetone, methylethyl ketone, methyl isobutyl ketone, diethyl ketone, cyclohexanone, alcohols, such as methanol, ethanol, propanols, butanols, ethylhexanol, ethylene glycol, propylene glycol, glycol monoalkyl ethers, such as methylglycol, ethylglycol, butylglycol, methoxypropanol, ethoxypropanol, methyldiglycol, ethyldiglycol, butyldiglycol, dipropylene glycol monomethyl ether, esters such as ethyl acetate, butyl acetate, ethyl propionate, methylglycol acetate, ethylglycol acetate, methoxypropyl acetate, ethyldiglycol acetate, amides, such as dimethylformamide, dimethylacetamide, dioxolanones, such as ethylene or propylene carbonate, N-methylpyrrolidone, dimethylsulphoxide and others. Here the solvents can be used alone or mixed, the latter especially when the solvent power of the individual solvent is insufficient on account of too low a polarity.

Depending on the proportion of the solvent used, solutions of thermosetting reactive resin mixtures with different solids contents can be prepared. In order to minimize environmental impace due to evaporation of the solvents, solutions are preferred which possess a solids content between 20 and 99 wt %, advantageously between 30 and 98 wt %, preferably between 50 and 97 wt % and especially between 60 and 95 wt %.

Use of monofunctional reactive diluents, which are usual in the field of epoxy paints, can likewise result in elimination of the incompatibility which may arise with the thermosetting reactive resin mixtures. In such cases it is possible under some circumstances to dispense with the use of volatile solvents completely.

As reactive diluents, the following compounds can for example be used (up to 10-15 wt % based on the solid resin): phenyl glycidyl ether, p-tert.-butylphenyl glycidyl ether, Cardura E10 (Shell) or ethylhexyl glycidyl ether.

The pot lives of the solvent-containing or reactive diluent containing thermosetting reactive resin mixtures of the invention as a rule are several months. Thus these are typical one-component systems. From the point of view of environmental acceptability, aqueous systems containing thermosetting reactive resin mixtures are of particular interest. These can be prepared by mixing of an aqueous emulsion or an aqueous solution of at least one carbamate compound of the general formulae I, II, III or IV with an aqueous emulsion or an aqueous solution of at least one organic compound containing at least two epoxide groups and at least one suitable catalyst.

If individual components of the thermosetting reactive resin mixtures of the invention are water-soluble, it is also possible to add such components as such (i.e. undissolved) to the aqueous emulsion or to the aqueous solution of other components. This applies above all for carbamate compounds of the general formula I or II, which are often water soluble, e.g.

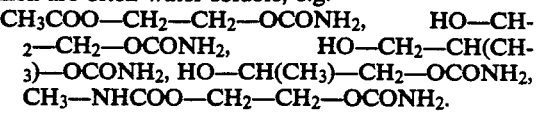
$CH_3COO—CH_2—CH_2—OCONH_2$, $HO—CH_2—CH_2—OCONH_2$, $HO—CH_2—CH(CH_3)—OCONH_2$, $HO—CH(CH_3)—CH_2—OCONH_2$, $CH_3—NHCOO—CH_2—CH_2—OCONH_2$.

However it can also be advantageous for processing technology if the aqueous systems of the thermosetting reactive resin mixtures of the invention also contain small quantities (up to ca. 10-15 wt % based on the solid resin) of organic solvents. In general these are additives which increase the emulsion stability, facilitate film formation after application of the thermosetting reactive resin mixtures, improve the flow of the coatings, improve the evaporative behaviour of the volatile components or are capable of favourably affecting other application-related properties.

The processing of the liquid thermosetting reactive resin mixtures of the invention as coating materials can be effected by usual methods, such as by painting, doctor application, spraying, rolling, casting or stamping. Preferable is processing by paint spraying by the many known means, e.g. with air pressure pistols or on an electrostatic plant. With the appropriate structure of the thermosetting reactive resin mixtures of the invention, electrophoretic enamelling can be the preferred processing method. The application of the electrophoretic enamels is effected by known methods.

After application, the reactive resin mixtures are then hardened by stoving, to produce the coatings according to the invention. These are distinguished by outstanding water and chemicals resistance and great hardness with, at the same time, remarkable elasticity.

The surface quality of the cross-linked coatings is very good, the paints are high-gloss and transparent and show outstanding adhesion on different substrates.

The outstanding properties of the paints—in particular their excellent resistance to chemicals and weathering—make it possible to use the thermosetting reactive resin mixtures of the invention successfully for the production of automobile paints, preferably automobile coating paints.

The hardening of the thermosetting reactive resin mixtures of the invention takes place at temperatures between 80° C. and 240° C., preferably between 100° C. and 180° C., especially between 120° C. and 160° C. The stoving times are normally determined on the basis of the chosen hardening temperature and generally total 20 to 30 minutes at 120°-140° C. However these times can be substantially reduced if one works at higher oven temperatures (e.g. 10 min at ca. 180° C.). On the other hand it can be advantageous to harden the coatings at lower temperatures—in such cases it is necessary to reckon with longer stoving times (up to 2 hours).

A further application variant, which it is preferable to use for the sake of environmental acceptability is the use of solid thermosetting reactive resin mixtures. If these are mixtures which have a softening temperature higher than 60° C., they can be dry-milled without difficulty. The powders so obtained can be prepared without addition of solvents and hence contain practically no volatile components. A preferred use field for such powder thermosetting reactive resin mixtures is powder coating.

A further possible way of preparing thermosetting reactive resin mixtures useable as cross-linkable powder paints consists in completely removing the solvent from a solvent-containing mixture. This is preferably accomplished by vacuum distillation. The solid mixtures so obtained can—optionally after addition of other processing aids and additives, such as pigments, rheological processing aids, conductivity improvers etc—be melted and mixed at increased temperature, e.g. in an extruder. After subsequent cooling these mixtures can be ground. Suitable epoxide compounds for this are for example bisphenol-A-based epoxide resins solid at room temperature, such as Epotuf 001, 002 and 004 (Reichold Chemie) or glycidyl methacrylate copolymers with appropriately high glass transition temperature, such as for example Finedic A-224S (Dainippon Ink & Chemicals).

The coating powders are applied in the known way by electrostatic powder spraying. The thermosetting reactive resin mixtures of the invention applied in this way are cross-linked by stoving, the stoving conditions for this being similar to those for conventionally applied lacquers.

A further application variant for the coating powders involves a subsequent wet milling of the powder obtained in water. If this process is performed for long enough, stable powder suspensions are formed, which can be applied and hardened in a comparable way to the aqueous thermosetting reactive resin mixtures obtained by conventional methods—already described above.

The thermosetting reactive resin mixtures of the invention represent a considerable advance compared with the epoxide resin systems which are known from the state of technology. The mixtures described in the present invention are stable at least for several months at room temperature, but cross-link at raised temperature considerably more quickly than other one-component systems.

As regards environmental acceptability, the thermosetting reactive resin mixtures according to the invention also offer considerable advantages, compared with other epoxide-based resin systems which are known from the state of technology. Thus the carbamate compounds of the general formulae I, II, III or IV are practically non-volatile, and hence less environmentally harmful than for example the readily volatile aliphatic amines, which also often have a toxic action.

The low volatility of the said carbamates, practically negligible during industrial use, also represents an advantage compared with acid anhydrides, which are also quite often used for the hardening of epoxide resins. It is well known that the low molecular weight carboxylic acid anhydrides tend to sublime during the stoving process. This leads to significant technological problems, but also causes injury to health.

A further advantage of the thermosetting reactive resin mixtures of the invention compared with for example anhydride-setting epoxide resin systems is due to the resistance of the carbamate compounds of the general formulae I, II, III and IV to hydrolysis. Hence the resin mixtures of the invention can also be used in aqueous media. This represents firstly an extension of the application fields for the said thermosetting reactive resin mixtures, and secondly at the same time a significant decrease in environmental impact. The simplification of the storage of the non-moisture sensitive resins of the invention also contributes significantly to the superiority of the cross-linking system presented.

An additional significant advantage of the thermosetting reactive resin mixtures compared with for example anhydride- or acid-setting epoxide resin systems is due to the very good compatibility of the carbamate compounds of the general formulae I, II, III and IV with commonly used epoxide resins. Consequently compatibility problems scarcely arise with the setting resin mixtures described in the present invention, so that the formulated—solvent-containing—paint systems often have solids contents of 80-90 wt % or even higher. A consequence of this is a remarkably low environmental impact due to evaporation of the solvent. The thermosetting reactive resin mixtures of the invention are therefore outstandingly suitable for the production of high-solids paint systems.

The carbamate compounds of the general formulae I, II, III and IV, which are essential components of the mixtures, are often synthesised from the low priced alkaline carbonates, such as ethylene or propylene carbonate. Consequently the production costs of the resin mixtures described in the present invention are very low.

Surprisingly it is then found that by the use of basic catalysts according to the invention a considerable decrease in the stoving temperature with a simultaneous shortening of the hardening times compared with described systems—e.g. V V Mikheev et al. (Lakokras. Mater. Ikh Primenen. (1987), No. 5, 13; (1987), No. 6, 26)—can be achieved.

It is also surprising that the thermosetting reactive resin mixtures of the invention can be formulated using primary aliphatic carbamates. From the knowledge according to the state of technology (especially J. Org. Chem. 29, (1964) 379; J Polym. Sci. A-14, (1966) 751; Sintez i fiziko-chimija polimerow 7, (1970) 42; 8, (1971) 45) particular unreactivity is to be expected for just this class of substances.

Thermosetting reactive resin mixtures according to the invention which contain monofunctional urethanes as carbamate compounds according to the general formulae I or II, such as e.g. $HOCH_2CH(CH_3)OCONH_2$, $HOCH_2CH_2OCONH_2$, $HOCH(CH_3)CH_2OCONH_2$ or $CH_3COOCH_2CH_2OCONH_2$, must be regarded as particularly surprising. Thus polyfunctionality of the carbamates is not an absolute requirement for the crosslinking of the thermosetting reactive resin mixtures.

The outstanding properties of the moulded articles or coatings which can be produced from the thermosetting reactive resin mixtures of the invention are also very surprising. Even using short-chain carbamates of the general formulae I or II, such as e.g. $CH_3COOCH_2CH_2OCONH_2$ or $HOCH(CH_3)CH_2OCONH_2$, mixtures with bisphenol-A diglycidyl ether yield hard, and at the same time elastic, cross-linked coatings. The cross-linking systems based on bisphenol-A diglycidyl ether known from the state of technology display a marked brittleness, which has to be compensated by the use of special elasticising cross-linkers.

The coatings obtained by stoving of the thermosetting reactive resin mixtures of the invention display a very good adhesion to different substrates. This is also the reason why the resin mixtures of the invention are outstandingly suitable for the production of thermosetting adhesives.

The thermosetting reactive resin mixtures can further be used for the production of moulded articles. Typically, the hardening of the moulded articles takes place between 100° C. and 240° C., preferably between 120° C. and 200° C. and especially between 140° C. and 180° C. After the initial hardening phase of ca. 4–8 hours, which may possibly be sufficient, it is often advantageous to subject the moulded articles obtained to an additional afterhardening. This is performed between 140° C. and 300° C., preferably between 160° C. and 260° C. and especially between 180° C. and 240° C. The typical afterhardening times are ca. 6 to 24 hours, preferably 10 to 16 hours.

The moulded articles obtained from the reactive resin mixtures of the present invention display very good mechanical and electrical properties. Consequently the thermosetting reactive resin mixtures of the invention can preferably be used as moulding compounds for the production of electrical components, such as printed circuits, and electronic equipment, such as pocket calculators, computers, clocks, cameras etc.

The thermosetting reactive resin mixtures of the invention can also be used for the production of soaking and impregnating compounds for electrical insulators or laminated composites or for glass- or carbon fibre-reinforced laminates. In this way composite materials with outstanding electrical, mechanical and thermal properties are obtained.

Insulating materials for electric motors or generators can advantageously also be produced using the thermosetting reactive resin mixtures of the invention, as can the production of highly thermally or mechanically stressed construction materials for aircraft components or space-ships.

In addition, the thermosetting reactive resin mixtures can be used as moulding resins in the production of containers, tubes and sports equipment, such as skis, surfboards, boats etc.

With the use of suitable propellants, the thermosetting reactive resins of the invention can also be used for the preparation of foamed materials.

EXAMPLES

The invention is illustrated in more detail by the following examples. Unless otherwise stated, all quantities given are based on parts by weight.

The solvent resistance of the coatings obtained from the thermosetting reactive resin mixtures of the invention is tested by rubbing the coated surface with a wad soaked in methyl ethyl ketone. A hardened coating is described as solvent-resistant if practically no traces can be seen on the surface after 75 double strokes.

The hardness of the stoved coatings is expressed as the pendulum hardness values measured (according to DIN 53175).

The elasticity of the coatings obtained after stoving is qualitatively assessed by bending the coated plate to an angle of 180° and observing any white-break which may occur. Those coatings which show no white-break and no flaking are described as elastic.

N-substituted or unsubstituted 2-hydroxyalkyl carbamates, such as e.g. $HOCH_2CH(CH_3)OCONH_2$, $HOCH_2OCONH_2$, $HOCH(CH_3)CH_2OCONH_2$, $HOCH_2CH_2OCONHCH_3$, etc. are prepared by known methods (e.g. P Adams and F A Baron, Chem. Reviews 65 (1965) 567).

By hydroxypropylcarbamate is meant $HOCH_2CH(CH_3)OCONH_2$, $HOCH(CH_3)CH_2OCONH_2$ or a mixture of these two primary urethanes.

| | |
|---|---|
| Beckopox EP 140 | Bisphenol-A-diglycidyl ether (epoxide value: 0.52–0.55) Product of Hoechst AG, Germany. |
| DER 332 E | Bisphenol-A-diglycidyl ether (epoxide value: 0.56–0.58) Product of Dow Chemical, USA. |
| Epotuf EP 139 | Bisphenol-A-diglycidyl ether (epoxide value: 0.51–0.54) Product of Reichhold Chemie AG, Switzerland. |
| Epotuf EP 140 | Bisphenol-A-diglycidyl ether (epoxide value: 0.51–0.54) Product of Reichhold Chemie AG, Switzerland. |
| Epotuf EP 001 | Bisphenol-A-based epoxide resin (epoxide value: 0.19–0.22) 75% solution in xylene) Product of Reichhold Chemie AG, Switzerland. |
| Epotuf VN 6394 | Aqueous emulsion of a Bisphenol-A-based epoxide resin (epoxide equivalent: 280) Product of Reichhold Chemie AG, Switzerland. |
| Epiclon 850 | Bisphenol-A-diglycidyl ether (epoxide equivalent: 184–194) Product of Dainippon Ink and Chemicals, Japan. |
| Epiclon 725 | Aliphatic triglycidyl ether based on trimethylolpropane (epoxide equivalent: 130–145) Product of Dainippon Ink and Chemicals, Japan. |
| Epiclon N-665 | Epoxy novolak based on o-cresol (epoxide equivalent: 200–230) Product of Dainippon Ink and Chemicals, Japan. |
| Epiclon N-730 | Epoxy novolak based on phenol (epoxide equivalent: 170–190) Product of Dainippon Ink and Chemicals, Japan. |
| Finedic A-224S | Glycidyl methacrylate based epoxyacrylate (epoxide equivalent: ca. 545) Product of Dainippon Ink and Chemicals, Japan. |
| TGIC | Triglycidyl isocyanurate Product of Nissan Chemical, Japan. |
| Degacure K 126 | Cycloaliphatic epoxide resin (epoxide equivalent: 132–143) Product of Degussa, Germany. |
| Grilonit G 1705 | Polyfunctional aliphatic epoxide resin (epoxide value: 0.71–0.75) Product of Ems-Chemie, Switzerland. |
| Denacol EX 611 | Sorbitol polyglycidyl ether Product of Nagase, Japan. |
| Polyisocyanate IPDI - T 1890 | A polyfunctional isocyanate with IPDI-based isocyanurate structure Product of Huls AG, Germany. |
| Trigonox C | A peroxide initiator based on tert.-butyl perbenzoate Product of AKZO, Germany. |

EXAMPLE 1

2-carbamato-2-methyl-ethyl-1-propionate $C_2H_5COOCH_2—CH(CH_3)OCONH_2$ is made from $HOCH_2CH(CH_3)OCONH_2$ and propionyl chloride in the presence of triethylamine, and isolated and purified by vacuum distillation.

A mixture of 350 parts of the propionate obtained $C_2H_5COOCH_2—CH(CH_3)OCONH_2$ and 350 parts Beckopox EP 140 is homogenised by stirring at ca. 60–°70° C. and after cooling to room temperature is treated with 5 parts 2-ethyl-4-methylimidazole and again homogenised. The clear colourless mixture so formed displays no change in viscosity even after several months, but can be set to a solid insoluble mass by heating at temperatures above 120° C.

EXAMPLE 2

2-carbamatoethyl-1-acetate CH$_3$COOCH$_2$CH$_2$OCONH$_2$ is prepared from hydroxyethyl carbamate and acetyl chloride in the presence of triethylamine and isolated and purified by vacuum distillation.

A mixture of 450 parts of the synthesised ester CH$_3$COOCH$_2$CH$_2$OCONH$_2$, 300 parts Epiclon 725 and 5 parts 1,8-diazabicyclo-(5,4,0)-undec-7-ene is homogenised by stirring. The clear colourless mixture so formed displays no change in viscosity even after several months, but can be set to a solid insoluble mass by heating at temperatures above 120° C.

EXAMPLE 3

A mixture of 35 parts Epotuf EP 139, 21 parts hydroxyethyl carbamate, 50 parts butylglycol and 1 part 1,5-diazabicyclo-(4,3,0)-non-5-ene is homogenised by stirring. The clear colourless mixture so formed displays no change in viscosity even after several weeks, and can be set to a solid insoluble mass by heating at temperatures above 120° C.

EXAMPLE 4

A mixture of 35 parts Beckopox EP 140, 10 parts hydroxyethyl carbamate, 45 parts Dowanol PMA (methoxypropyl acetate, Dow Chemicals) and 1 part 1,4-diazabicyclo-(2,2,2)-octane is homogenised by stirring. The clear colourless mixture so formed displays no change in viscosity even after several weeks, and can be set to a solid insoluble mass by heating at temperatures above 120° C.

EXAMPLE 5

A mixture of 50 parts DER 332E, 10 parts hydroxyethyl carbamate, 50 parts methylglycol acetate and 1 part 4-dimethylaminopyridine is homogenised by stirring. The clear colourless mixture so formed displays no change in viscosity even after several months, and can be set to a solid insoluble mass by heating at temperatures above 120° C.

EXAMPLE 6

A mixture of 70 parts Epotuf EP 140, 50 parts hydroxypropyl carbamate, 80 parts ethylglycol acetate and 2 parts benzyltrimethylammonium hydroxide (ca. 40% solution in methanol) is homogenised by stirring. The clear colourless mixture so formed displays no change in viscosity even after several months, and can be set to a solid insoluble mass by heating at temperatures above 120° C.

EXAMPLE 7

A mixture of 70 parts Epiclon 850, 25 parts hydroxypropyl carbamate, 75 parts butanol and 2 parts tetramethylguanidine is homogenised by stirring. The clear colourless mixture so formed displays no change in viscosity even after several months, and can be set to a solid insoluble mass by heating at temperatures above 120° C.

EXAMPLE 8

A mixture of 70 parts Epotuf EP 139, 12 parts hydroxypropyl carbamate, 75 parts benzyl acetate and 3 parts tetramethylammonium hydroxide (ca. 20% solution in methanol) is homogenised by stirring. The clear colourless mixture so formed displays no change in viscosity even after several weeks, and can be set to a solid insoluble mass by heating at temperatures above 120° C.

EXAMPLE 9

A mixture of 35 parts Epiclon 850, 25 parts hydroxypropyl carbamate, 60 parts diethylene glycol dimethyl ether and 1 part imidazole is homogenised by stirring. The clear colourless mixture so formed displays no change in viscosity even after several weeks, and can be set to a solid insoluble mass by heating at temperatures above 120° C.

EXAMPLE 10

A mixture of 70 parts Epotuf EP 001, 15 parts hydroxypropyl carbamate, 30 parts xylene, 50 parts butylglycol and 2 parts 1-methylimidazole is homogenised by stirring. The clear colourless mixture so formed displays no change in viscosity even after several weeks, and can be set to a solid insoluble mass by heating at temperatures above 120° C.

EXAMPLE 11

A mixture of 17 parts Finedic A-224S, 2 parts hydroxypropyl carbamate, 5 parts dimethyl formamide, 15 parts methylglycol acetate and 1 part tetrabutylammonium fluoride is homogenised by stirring. The clear colourless mixture so formed displays no change in viscosity even after several weeks, and can be set to a solid insoluble mass by heating at temperatures above 120° C.

EXAMPLE 12

A mixture of 25 parts Epiclon N-665, 10 parts hydroxypropyl carbamate, 5 parts dimethyl sulphoxide, 20 parts ethylglycol acetate and 1 part triphenylphosphane is homogenised by stirring. The clear colourless mixture so formed displays no change in viscosity even after several months, and can be set to a solid insoluble mass by heating at temperatures above 120° C.

EXAMPLE 13

A mixture of 40 parts Epiclon N-730, 25 parts hydroxypropyl carbamate, 25 parts butylglycol and 5 parts sodium methoxide (ca. 30% solution in methanol) is homogenised by stirring. The clear colourless mixture so formed displays no change in viscosity even after several weeks, and can be set to a solid insoluble mass by heating at temperatures above 120° C.

EXAMPLE 14

A mixture of 40 parts TGIC, 10 parts hydroxyethyl carbamate, 150 parts methylglycol acetate and 1.5 parts 1,8-diazabicyclo-(5,4,0)-undec-7-ene is homogenised by stirring. The clear colourless mixture so formed displays no change in viscosity even after several weeks, and can be set to a solid insoluble mass by heating at temperatures above 120° C.

EXAMPLE 15

A mixture of 140 parts of Degacure K126, 60 parts hydroxypropyl carbamate, 200 parts ethylglycol acetate and 2 parts 1,8-diazabicyclo-(5,4,0)-undec-7-ene is homogenised by stirring. The clear colourless mixture so formed displays no change in viscosity even after several weeks, and can be set to a solid insoluble mass by heating at temperatures above 120° C.

EXAMPLE 16

A mixture of 140 parts Grilonit G 1705, 50 parts hydroxyethyl carbamate, 200 parts ethylglycol acetate and 2 parts 1,4-diazabicyclo-(2,2,2)-octane is homogenised by stirring. The clear colourless mixture so formed displays no change in viscosity even after several weeks, and can be set to a solid insoluble mass by heating at temperatures above 120° C.

EXAMPLE 17

A mixture of 100 parts Denacol EX 611, 50 parts hydroxyethyl carbamate, 150 parts butylglycol acetate and 2 parts 2-ethyl-4-methylimidazole is homogenised by stirring. The clear colourless mixture so formed displays no change in viscosity even after several weeks, and can be set to a solid insoluble mass by heating at temperatures above 120° C.

EXAMPLE 18

A mixture of 14 parts of a 27% solution of TGIC in methylglycol acetate, 2 parts hydroxyethyl carbamate and 0.15 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 100° C. insoluble and infusible networks are formed.

EXAMPLE 19

A mixture of 12.53 parts of a 27% solution of TGIC in methylglycol acetate, 2 parts hydroxypropyl carbamate and 0.15 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 100° C. insoluble and infusible networks are formed.

EXAMPLE 20

A mixture of 4.85 parts Beckopox EP 140, 3 parts hydroxyethyl carbamate, 7 parts methylglycol acetate and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 21

A mixture of 6.5 parts Beckopox EP 140, 2 parts hydroxyethyl carbamate, 8 parts methylglycol acetate and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 22

A mixture of 5.72 parts Beckopox EP 140, 2 parts hydroxypropyl carbamate, 7 parts methylglycol acetate and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 23-25

A mixture of 6.5 parts Beckopox EP 140, 2.2 parts hydroxyethyl carbamate, 8 parts methylglycol acetate and 0.2 parts of basic catalyst is homogenised by stirring. The clear colourless solution formed is stable for several weeks at room temperature and displays no increase in viscosity. When this solution is heated at temperatures above 120° C. insoluble and infusible networks are formed.

Example 23 —catalyst: DABCO
Example 24 —catalyst: 4-dimethylaminopyridine
Example 25 —catalyst: 2-ethyl-4-methylimidazole

EXAMPLE 26-30

A mixture of 4.85 parts Epotuf EP 139, 3.1 parts hydroxyethyl carbamate, 7 parts methylglycol acetate and 0.2 parts of basic catalyst is homogenised by stirring. The clear colourless solution formed is stable for several weeks at room temperature and displays no increase in viscosity. When this solution is heated at temperatures above 100° C. insoluble and infusible networks are formed.

Example 26 —catalyst: benzyltrimethylammonium hydroxide
Example 27 —catalyst: tetramethylammonium hydroxide
Example 28 —catalyst: tetraethylammonium fluoride
Example 29 —catalyst: 1,5-diazabicyclo-(4,3,0)-non-5-ene
Example 30 —catalyst: 1,1,3,3-tetramethylguanidine

EXAMPLE 31-33

A mixture of 6.5 parts Epotuf EP 139, 2.2 parts hydroxyethyl carbamate, 8 parts methylglycol acetate and 0.2 parts of basic catalyst is homogenised by stirring. The clear colourless solution formed is stable for several weeks at room temperature and displays no increase in viscosity. When this solution is heated at temperatures above 120° C. insoluble and infusible networks are formed.

Example 31 —solvent: diethylene glycol diethyl ether
Example 32 —solvent: butylglycol acetate
Example 33 —solvent: benzyl acetate

EXAMPLE 34

A mixture of 4.62 parts Epotuf EP 139, 4 parts 2-carbamatoethyl-1-acetate $CH_3COOCH_2CH_2OCONH_2$, 8 parts methylglycol acetate and 0.18 g 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 35

A mixture of 5.3 parts Epotuf EP 140, 5 parts carbamatopropyl acetate $CH_3COOCH(CH_3)CH_2OCONH_2$, 10 parts methylglycol acetate and 0.2 g 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 36

A mixture of 5.3 parts Epotuf EP 140, 2.5 parts carbamatopropyl acetate $CH_3COOCH(CH_3)CH_2OCONH_2$, 7 parts methylglycol acetate and 0.19 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 37

A mixture of 6.98 parts Epotuf EP 001, 1.7 parts hydroxyethyl carbamate, 8.7 parts methylglycol acetate and 0.19 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 38

A mixture of 9.3 parts Epotuf EP 001, 1.1 parts hydroxyethyl carbamate, 10.4 parts methylglycol acetate and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 39

A mixture of 15 parts of a 50% solution of Finedic A-224S in methylglycol acetate, 1.5 parts hydroxyethyl carbamate and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 100° C. insoluble and infusible networks are formed.

EXAMPLE 40

A mixture of 17.7 parts of a 50% solution of Finedic A-224S in methylglycol acetate, 1 part hydroxyethyl carbamate and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 100° C. insoluble and infusible networks are formed.

EXAMPLE 41

A mixture of 15 parts of a 50% solution of Finedic A-224S in methylglycol acetate, 1.5 parts hydroxyethyl carbamate and 0.2 parts 1,5-diazabicyclo-(4,3,0)-non-5-ene is homogenised by stirring. The clear colourless solution formed is stable for several weeks at room temperature and displays no increase in viscosity. When this solution is heated at temperatures above 100° C. insoluble and infusible networks are formed.

EXAMPLE 42

A mixture of 17.6 parts of a 50% solution of Finedic A-224S in methylglycol acetate, 2.1 parts hydroxyethyl carbamate and 0.2 parts 1,5-diazabicyclo-(4,3,0)-non-5-ene is homogenised by stirring. The clear colourless solution formed is stable for several weeks at room temperature and displays no increase in viscosity. When this solution is heated at temperatures above 100° C. insoluble and infusible networks are formed.

EXAMPLE 43

2,2,4-trimethylhexamethylene-1,6-di(hydroxyethyl)-carbamate is prepared in methyl ethyl ketone solution from 2,2,4-trimethylhexamethylene diisocyanate and a ca. 10-fold excess of ethylene glycol. The crude product is isolated by concentration in vacuum (100° C., 0.01 mbar).

A mixture of 3 parts of the bis(hydroxyethyl) carbamate prepared, 3.06 parts Epotuf EP 139, 6 parts butylglycol and 0.12 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 44

A ca. 50% solution of isophorone bis-(hydroxyethyl) carbamate is prepared from 34 parts isophorone diamine, 35.2 parts ethylene carbonate and 69 parts butylglycol.

A mixture of 6.12 parts of the solution obtained, 3 parts Epotuf EP 139, 3 parts butylglycol and 0.13 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 45

The urethane diol, $HOCH_2CH_2NHCOOCH_2CH_2OH$, is prepared from 88 parts ethylene carbonate and 61 parts ethanolamine.

A mixture of 2 parts of the urethane diol produced, 4.6 parts Epotuf EP 139, 6 parts methylglycol acetate and 0.16 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 160° C. insoluble and infusible networks are formed.

EXAMPLE 46

The urethane diol, $HOCH_2CH_2OCONHCH_2CH_2NHCOOCH_2CH_2OH$, is prepared from 176 parts ethylene carbonate and 60 parts ethylenediamine. A mixture of 3.5 parts of the urethane diol produced, 5.05 parts Epotuf EP 139, 15 parts butylglycol acetate and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 160° C. insoluble and infusible networks are formed.

EXAMPLE 47

On the basis of EPA 152 820 (Example 1) bis-(2-hydroxypropyl)-(iminodiethylene)-bis-carbamate is prepared from 107 parts propylene carbamate and 51.6 parts diethylene triamine.

A mixture of 3 parts of the bis-carbamate prepared, 3.33 parts Epotuf EP 139, 6.3 parts butylglycol and 0.15 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 48

The urethane carbamate $C_4H_9NHCOOCH_2CH_2OCONH_2$ is made from 21 parts hydroxyethylurethane, 100 parts methyl ethyl ketone and 200 parts butyl isocyanate and isolated practically pure after removal of the solvent.

A mixture of 1.05 parts of the urethane carbamate produced, 3.33 parts Epotuf EP 139, 4.3 parts butylglycol and 0.12 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 49

A mixture of 110 parts hydroxyethyl urethane, 100 parts succinic anhydride and 105 parts methylglycol acetate is reacted for 6 hours at 120° C. During this time the anhydride is practically completely consumed (IR-monitoring of the C=0 anhydride valence vibration) and the carboxyl urethane $HOOCCH_2CH_2COOCH_2CH_2OCONH_2$ is formed. The solution obtained is then treated with 170 parts Epotuf EP 139 and 0.5 parts tetrabutylammonium bromide and reacted 3 hours at 90°-100° C.

5.51 parts of the reaction solution formed are mixed with a further 2.5 parts Epotuf EP 139, 6 parts methylglycol acetate and 0.15 parts 1,8-diazabicyclo-(5,4,0)-undec-7-ene and homogenised by stirring. The clear light yellow solution formed is stable for several weeks at room temperature and displays no increase in viscosity. When this solution is heated at temperatures above 120° C. insoluble and infusible networks are formed.

EXAMPLE 50

N-butyl hydroxyethyl carbamate $C_4H_9NHCOOCH_2CH_2OH$ is prepared from 73 parts butylamine and 88 parts ethylene carbonate.

A mixture of 3.2 of the carbamate produced, 4 parts Epotuf EP 139, 7 parts butanol and 0.25 parts 1,8-diazabicyclo-(5,4,0)-undec-7-ene is homogenised by stirring. The clear colourless solution formed is stable for several weeks at room temperature and displays no increase in vicosity. When this solution is heated at temperatures above 140° C. insoluble and infusible networks are formed.

EXAMPLE 51

N-ethyl hydroxypropyl carabamate $C_2H_5NHCOOCH(CH_3)CH_2OH$ is prepared from 102 parts proplyene carbonate and 65 parts of a 70% solution of ethylamine in water.

A mixture of 3 parts of the carbamate produced, 3.5 parts Epotuf EP 139, 6 parts butylglycol and 0.25 parts 1,5-diazabicyclo-(4,3,0)-none-5-ene is homogenised by stirring. The clear colourless solution formed is stable for several weeks at room temperature and displays no increase in viscosity. When this solution is heated at temperatures above 140° C. insoluble and infusible networks are formed.

EXAMPLE 52

N-allyl hydroxyethyl carbamate, $CH_2=CH-CH_2NHCOOCH_2CH_2OH$ is made from 88 parts ethylene carbonate and 57 parts allylamine.

A mixture of the 2.9 parts of the carbamate produced, 3.3 parts Epotuf EP 139, 6 parts methylglycol acetate and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 53

N-(3-pyridylmethyl)-hydroxyethyl carbamate is prepared from 10.8 parts 3-(aminomethyl)pyridine and 8.8 parts ethylene carbonate.

A mixture of 4 parts of the urethane produced, 3.5 parts Epotuf EP 139, 8 parts butylglycol and 0.25 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 54

The diether diurethane $HOCH_2CH_2OCONH(CH_2)_3O(CH_2)_2O-(CH_2)_3NHCOOCH_2CH_2OH$ is prepared from 17.6 parts 4,7-dioxydecane-1,10-diamine (a development product of BASF Co.) and 17.6 parts ethylene carbonate. A mixture of 5 parts of the diurethane produced, 5 parts Epotuf EP 139, 10 parts butylglycol and 0.25 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 55

Toluylene-2,4-di-(hydroxyethyl) carbamate is prepared from 17.4 parts toluylene diisocyanate, 100 parts methyl ethyl ketone and 100 parts ethylene glycol. After concentration of the reaction mixture in vacuum, practically pure reaction product is obtained.

A mixture of 6 parts of the diurethane produced, 7 parts Epotuf EP 139, 15 parts butylglycol and 0.25 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 56

Diphenylmethane di-(hydroxyethyl) carbamate is prepared from 25 parts diphenylmethane diisocyanate and 100 parts ethylene glycol in methyl ethyl ketone. A practically pure reaction product is obtained after removal of the solvent and the excess ethylene glycol in vacuo.

A mixture of 4 parts of the diurethane produced, 3.8 parts Epotuf EP 139, 10 parts butylglycol and 0.25 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 57

The tricarbamate $N(CH_2CH_2NHCOOCH_2CH_2OH)_3$ is prepared from 15 parts tris-(2-aminoethyl)-amine and 27 parts ethylene carbonate.

A mixture of 4.1 parts of the triurethane produced, 5.1 parts Epotuf EP 139, 10 parts butylglycol and 0.25 parts 1,8-diazabicyclo-(5,4,0)-undec-7-ene and homogenised by stirring. The clear colourless solution formed is stable for several weeks at room temperature and displays no increase in viscosity. When this solution is heated at temperatures above 140° C. insoluble and infusible networks are formed.

EXAMPLE 58

The ester carbamate $CH_3COOCH_2CH_2OCONHCH_3$ is prepared from 39.5 parts acetyl chloride, 60 parts N-methyl hydroxyethyl carbamate, 51 parts triethylamine and 100 parts methylglycol acetate and after filtering off the triethylammonium hydrochloride formed and concentration in vacuum it is isolated by vacuum distillation (B.Pt 102°–105° C./0.01 mbar).

A mixture of 8 parts of the carbamate produced, 8 parts Epotuf EP 139, 10 parts ethylglycol acetate and 0.25 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 59

The carbamate $C_6H_{11}NHCOOCH_2CH_2OCONH_2$ is prepared from 12.5 parts cyclohexyl isocyanate, 10.5 parts hydroxyethyl carbamate and 23 parts methylglycol acetate.

A mixture of 10 parts of the carbamate produced (as 50% solution), 4 parts Epotuf EP 139, 15 parts butylglycol is 0.2 parts 1,8-diazabicyclo-(5,4,0)-undec-7-ene and homogenised by stirring. The clear colourless solution formed is stable for several weeks at room temperature and displays no increase in viscosity. When this solution is heated at temperatures above 140° C. insoluble and infusible networks are formed.

EXAMPLE 60

The carbamate $C_4H_9NHCOOCH_2CH_2OCONHCH_3$ is prepared from 10 parts butyl isocyanate, 12 parts N-methylhydroxyethyl carbamate and 22 parts methylglycol acetate.

A mixture of 9 parts of the mixture obtained, 3.5 parts Epotuf EP 139, 15 parts butylglycol and 0.25 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 61

The diester dicarbamate $H_2NCOOCH_2CH_2OCO(CH_2)_8COOCH_2CH_2OCONH_2$ is prepared from 30 parts sebacoyl dichloride, 26 parts hydroxyethyl carbamate, 26 parts triethylamine and 100 parts methylglycol acetate and isolated after filtering off the triethylammonium hydrochloride formed and concentration in vacuum.

A mixture of 4 parts of the dicarbamate produced, 3.5 parts Epotuf EP 139, 10 parts methylglycol acetate and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 62

The diester dicarbamate $H_2NCOOC_3H_6OCO(CH_2)_4COOC_3H_6OCONH_2$ is prepared from 23 parts adipoyl dichloride, 30 parts hydroxypropyl carbamate, 26 parts triethylamine and 100 parts methylglycol acetate and isolated after filtering off the triethylammonium hydrochloride formed and concentration in vacuum.

A mixture of 7 parts of the dicarbamate produced, 7 parts Epotuf EP 139, 15 parts methylglycol acetate and 0.25 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 63

The dicarbamate $H_2NCOOC_3H_6OCONH(CH_2)_6NHCOOC_3H_6OCONH_2$ is prepared from 45 parts hexamethylene diisocyanate, 53 parts hydroxypropyl carbamate and 200 parts methylglycol acetate and isolated after concentration in vacuum.

A mixture of 7.5 parts of the product obtained, 6.5 parts Epotuf EP 139, 15 parts butylglycol acetate and 0.25 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 64

The dicarbamate $H_2NCOOC_3H_6OCONH-C_{10}H_{18}-NHCOOC_3H_6-CONH_2$ is prepared as a ca. 50% solution from 22.2 parts isophorone diisocyanate, 23.8 parts hydroxypropyl carbamate and 46 parts methylglycol acetate.

A mixture of 9.2 parts of the product obtained, 3.4 parts Epotuf EP 139, and 0.25 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 65

The dicarbamate $H_2NCOOC_3H_6OCONH-C_7H_6NHCOOC_3H_6OCONH_2$ is prepared as a ca. 25% solution from 17.4 parts toluylene diisocyanate, 23.8 parts hydroxypropyl carbamate and 123.6 parts methylglycol acetate.

A mixture of 16.5 parts of the product obtained, 3.4 parts Epotuf EP 139, 0.25 parts 1,8-diazabicyclo-(5,4,0)-undec-7-ene is homogenised by stirring. The clear colourless solution formed is stable for several weeks at room temperature and displays no increase in viscosity.

When this solution is heated at temperatures above 120° C. insoluble and infusible networks are formed.

EXAMPLE 66

A primary polyfunctional carbamate is prepared as ca. 50% solution from 105 parts polyisocyanate IPDI-T 1890, 36 parts hydroxypropyl carbamate and 78 parts methylglycol acetate.

A mixture of 14.5 parts of the product obtained, 3.4 parts Epotuf EP 139 and 0.2 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 67

8.8 parts ethylene carbonate are dissolved in 50 parts methanol, treated dropwise at room temperature with 17.6 parts N-ethyl ethylenediamine and the solution obtained stirred for 2 hours at room temperature.

Next the mixture is concentrated in vacuum and freed of solvent and excess N-ethyl ethylenediamine. The crude product obtained is taken up in 35 parts butylglycol, treated with 17 parts Epotuf EP 139 at room temperature and stirred for 4 hours at room temperature. In this way the dicarbamate $HOCH_2CH_2OCONHCH_2N(C_2H_5)CH_2CH(OH)CH_2OC_6H_4\text{—}_2C(CH_3)_2$ [sic] is formed as a ca. 50% solution.

A mixture of 35 parts of the solution obtained, 8.5 parts Epotuf EP 139 and 0.5 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 68

The Bisphenol-A dicarbonate ether is prepared from Epotuf EP 139 and carbon dioxide according to DE-OS 35 29 263.

A mixture of 42.8 parts of the dicarbonate obtained, 55 parts butylglycol and 12.2 parts ethanolamine is stirred for 2 hours at room temperature and a further 2 hours at 60° C. In this way the dicarbamate $[HOCH_2CH_2NHCOOCH_2CH(OH)CH_2OC_6H_4\text{-}]_2C(CH_3)_2$ is formed as ca. 50% solution.

A mixture of 27.5 parts of the solution obtained, 8.5 parts Epotuf EP 139 and 0.5 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 69

The Bisphenol-A dicarbonate ether is prepared from Epotuf EP 139 and carbon dioxide according to DE-OS 35 29 263.

A mixture of 42.8 parts of the dicarbonate obtained and 49 parts butylglycol is stirred at 60° C. Meanwhile gaseous methylamine is passed through the mixture until cyclocarbonate groups are no longer present (IR-monitoring). During the reaction the dicarbamate $[CH_3NHCOOCH_2CH(OH)CH_2OC_6H_4\text{—}]_2C(CH_3)_2$ is formed as ca. 50% solution.

A mixture of 25 parts of the solution obtained, 8.5 parts Epotuf EP 139, and 0.5 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 70

8.8 parts ethylene carbonate are dissolved in 50 parts methanol, treated dropwise at room temperature with 17.6 parts N-ethyl ethylene diamine and the solution obtained stirred for 2 hours at room temperature.

Next the mixture is concentrated in vacuum and freed of solvent and excess N-ethyl ethylenediamine. The crude product obtained is taken up in 66 parts butylglycol, treated at room temperature with 48.4 parts Epotuf EP 139 and stirred for 4 hours at room temperature. As a result a 50% solution of the dicarbamate derivative of the epoxide resin Epotuf EP 139 is formed.

A mixture of 66 parts of the solution obtained, 8.5 parts Epotuf EP 139, 0.5 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 140° C. insoluble and infusible networks are formed.

EXAMPLE 71

A mixture of 15.5 parts isocyanatoethyl methacrylate (a product of Dow Chemicals, USA), 76 parts 1,2-propylene glycol and 100 parts methylglycol acetate is stirred at 80° C. After ca. 2 hours the isocyanate can no longer be detected by IR spectroscopy. The solvent and excess propylene glycol are removed from the reaction mixture in vacuo (thin film evaporator, 80° C., ca. 0.01 mbar). The hydroxypropylurethane methacrylate $CH_2=C(CH_3)COOCH_2CH_2NH\text{-}COOCH_2CH(OH)CH_3$ remains as a residue.

EXAMPLE 72

20 parts methyl ethyl ketone and 20 parts butyl acetate are mixed and heated to boiling under reflux while passing nitrogen. Over a period of 3 hours a solution of 20 parts of the hydroxypropylurethane methacrylate prepared according to Example 71, 20 parts methyl methacrylate, 20 parts styrene, 40 parts butyl acrylate and 20 parts butyl acetate is added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 73

A mixture of 100 parts of the resin solution obtained according to Example 72, 7.5 parts Epotuf EP 139 and 0.5 parts 1,8-diazabicyclo-(5,4,0)-undec-7-ene is homogenised by stirring. The clear light-yellow solution formed is stable for several weeks at room temperature and displays no increase in viscosity. When this solution is heated at temperatures above 140° C. insoluble and infusible networks are formed.

EXAMPLE 74

A mixture of 18.6 parts glyceryl cyclocarbonatomethacrylate (prepared from 3-chloro-2-hydroxypropyl-1-methacrylate and sodium hydrogen carbonate according to DE-PS 37 23 782), 10 parts ethanolamine and 25 parts ethanol is stirred at 80° C. After ca. 2 hours cyclocarbonate groups can practically no longer be detected by IR-spectroscopy. The solvent and excess ethanolamine are removed from the reaction mixture in vacuo (thin film evaporator, 80° C., ca. 0.01 mbar). The hydroxypropyl urethane methacrylate $CH_2=C(CH_3)COOCH_2—CH(OH)C-H_2OCONHCH_2CH_2OH$ remains as residue.

EXAMPLE 75

20 parts methyl ethyl ketone and 20 parts butyl acetate are mixed and heated to boiling under reflux while passing nitrogen. Over a period of 3 hours a solution of 20 parts of the hydroxypropylurethane methacrylate prepared according to Example 74, 3 parts methacrylic acid, 27 parts styrene, 50 parts butyl acrylate and 20 parts butyl acetate is added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 76

A mixture of 100 parts of the resin solution obtained according to Example 75, 11 parts Epotuf EP 139 and 0.5 parts 1,8-diazabicyclo-(5,4,0)-undec-7-ene is homogenised by stirring. The clear light-yellow solution formed is stable for several weeks at room temperature and displays no increase in viscosity. When this solution is heated at temperatures above 140° C. insoluble and infusible networks are formed.

EXAMPLE 77

A mixture of 10.2 parts propylene carbonate, 20 parts N-ethyl ethylenediamine and 25 parts ethanol is stirred at 80° C. After ca. 2 hours, cyclocarbonate groups can practically no longer be detected by IR spectroscopy. The solvent and excess N-ethyl ethylene diamine are removed from the reaction mixture in vacuo (thin layer evaporator, 80° C., ca. 0.01 mbar). The hydroxyurethanamine $C_2H_5NHCH_2CH_2NHCOOCH_2C-H(OH)CH_3$ remains as a residue.

The reaction product obtained is dissolved in 100 parts butyl acetate and 10.5 parts triethylamine, cooled to ca. 10° C. and the cooled solution treated dropwise at 10° C. -15° C. with 9 parts acryloyl chloride. Next the mixture is stirred for 2 hours at room temperature, the precipitate deposited is filtered off and the clear reaction solution concentrated in vacuo (thin film evaporator, 60° C., ca. 0.01 mbar). The hydroxyurethaneacrylamide $CH_2=CHCON(C_2H_5)CH_2CH_2NHCOO-CH_2CH(OH)CH_3$ remains as a residue.

EXAMPLE 78

20 parts methyl ethyl ketone and 20 parts butyl acetate are mixed and heated to boiling under reflux while passing nitrogen. Over a period of 3 hours a solution of 20 parts of the hydroxyurethane acrylamide prepared according to Example 77, 10 parts methyl methacrylate, 20 parts styrene, 10 parts acrylonitrile, 40 parts butyl acrylate and 20 parts butyl acetate is added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 79

A mixture of 100 parts of the resin solution obtained according to Example 78, 7.5 parts Epotuf EP 139 and 0.5 parts 1,8-diazabicyclo-(5,4,0)-undec-7-ene is homogenised by stirring. The clear light-yellow solution formed is stable for several weeks at room temperature and displays no increase in viscosity. When this solution is heated at temperatures above 140° C. insoluble and infusible networks are formed.

EXAMPLE 80

The urethane-ethyl acrylate $CH_2=CHCOOCH_2C-H_2OCONH_2$ is obtained from acryloyl chloride and hydroxyethyl urethane, $HOCH_2CH_2OCONH_2$, after V V Mikheev et al., Izv. Vyssh. Uchebn. Zaved., Khim. Khim. Tekhnol., 31 (1988) 42.

20 parts methyl ethyl ketone and 20 parts butyl acetate are mixed and heated to boiling under reflux while passing nitrogen. Over a period of 3 hours a solution of 20 parts of the urethane ethyl acrylate prepared, $CH_2=CHCOOCH_2CH_2OCONH_2$, 20 parts methyl methacrylate, 15 parts styrene, 5 parts acrylamide, 40 parts butyl acrylate and 20 parts butyl acetate is added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 81

A mixture of 100 parts of the resin solution obtained according to Example 80, 11 parts Epotuf EP 139 and 0.5 parts 1,8-diazabicyclo-(5,4,0)-undec-7-ene is homogenised by stirring. The clear light-yellow solution formed is stable for several weeks at room temperature and displays no increase in viscosity. When this solution is heated at temperatures above 140° C. insoluble and infusible networks are formed.

EXAMPLE 82

The urethane ethyl methacrylate $CH_2=C(CH_3)COOCH_2CH_2OCO-NHCH_3$ is obtained from methacryloyl chloride and N-methyl hydroxyethylurethane, HOCH$_2$CH$_2$OCONHCH$_3$, after V V Mikheev et al., Izv. Vyssh. Uchebn. Zaved., Khim. Khim. Tekhnol., 31 (1988) 42.

20 parts methyl ethyl ketone and 20 parts butyl acetate are mixed and heated to boiling under reflux while passing nitrogen. Over a period of 3 hours a solution of 20 parts of the urethane ethyl methacrylate prepared, CH$_2$=C(CH$_3$)COOCH$_2$CH$_2$OCONHCH3, 20 parts methyl methacrylate, 20 parts styrene, 10 parts dimethyl itaconate, 30 parts ethylhexyl acrylate and 20 parts butyl acetate is added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 83

A mixture of 100 parts of the resin solution obtained according to Example 82, 10 parts Epotuf EP 139 and 0.5 parts 1,8-diazabicyclo-(5,4,0)-undec-7-ene is homogenised by stirring. The clear light-yellow solution formed is stable for several weeks at room temperature and displays no increase in viscosity. When this solution is heated at temperatures above 140° C. insoluble and infusible networks are formed.

EXAMPLE 84

A solution of 19 parts of the hydroxyurethanamine C$_2$H$_5$NHCH$_2$CH$_2$NHCOOCH$_2$CH(OH)CH$_3$ prepared according to Example 77 and 50 parts isopropanol is added dropwise over a period of 1 hour to a solution of 14.2 parts glycidyl methacrylate and 25 parts isopropanol at room temperature. The mixture obtained is then stirred a further 2 hours at room temperature. During this time practically all the epoxide groups react.

The solvent is removed from the reaction mixture in vacuo (thin film evaporator, 60° C., ca. 0.01 mbar). The hydroxyurethane methacrylate CH$_2$=C(CH$_3$)COOCH$_2$CH(OH)-CH$_2$N(C$_2$H$_5$)CH$_2$CH$_2$NHCOOCH$_2$CH(OH)CH$_3$ remains as a residue.

EXAMPLE 85

20 parts methyl ethyl ketone and 20 parts butyl acetate are mixed and heated to boiling under reflux while passing nitrogen. Over a period of 3 hours a solution of 25 parts of the hydroxyurethane methacrylate prepared according to Example 84, 25 parts methyl methacrylate, 50 parts butyl acrylate and 20 parts butyl acetate is added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 86

A mixture of 100 parts of the resin solution obtained according to Example 85, 7 parts Epotuf EP 139 and 0.5 parts 1,8-diazabicyclo-(5,4,0)-undec-7-ene is homogenised by stirring. The clear light-yellow solution formed is stable for several weeks at room temperature and displays no increase in viscosity. When this solution is heated at temperatures above 140° C. insoluble and infusible networks are formed.

EXAMPLE 87

A solution of 19 parts of the hydroxyurethanamine C$_2$H$_5$NHCH$_2$CH$_2$NHCOOCH$_2$CH(OH)CH$_3$ prepared according to Example 77 and 25 parts isopropanol is added dropwise over 1 hour to 21 parts of a 48% aqueous solution of N-(hydroxymethyl)acrylamide at room temperature. The mixture obtained is then stirred a further 2 hours at room temperature. The solvent is removed from the reaction mixture in vacuo (thin film evaporator, 60° C., ca. 0.01 mbar). The hydroxyurethane acrylamide CH$_2$=CHCONHCH$_2$N(C$_2$H$_5$)CH$_2$CH$_2$NH-COOCH$_2$CH(OH)CH$_3$ remains as a residue.

EXAMPLE 88

20 parts methyl ethyl ketone and 20 parts butyl acetate are mixed and heated to boiling under reflux while passing nitrogen. Over a period of 3 hours a solution of 25 parts of the hydroxyurethane acrylamide prepared according to Example 87, 25 parts methyl methacrylate, 50 parts butyl acrylate and 20 parts butyl acetate is added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 89

A mixture of 100 parts of the resin solution obtained according to Example 88, 8 parts Epotuf EP 139 and 0.5 parts 1,8-diazabicyclo-(5,4,0)-undec-7-ene is homogenised by stirring. The clear light-yellow solution formed is stable for several weeks at room temperature and displays no increase in viscosity. When this solution is heated at temperature above 140° C. insoluble and infusible networks are formed.

EXAMPLE 90

A solution of 76 parts propylene glycol in 100 parts methylglycol acetate is added dropwise over one hour at room temperature to a solution of 20.1 parts m-TMI (a product of American Cyanamid Company, USA) in 100 parts methylglycol acetate. The mixture obtained is then stirred for 4 hours at 80° C. The solvent and excess propylene glycol are then removed in vacuo (thin film evaporator, 80° C., ca. 0.01 mbar). The hydroxyurethane derivative of alpha-methylstyrene CH$_2$=C(CH$_3$)C$_6$H$_4$C(CH$_3$)$_2$NHCOOCH$_2$CH(OH)CH$_3$ remains as a residue.

EXAMPLE 91

20 parts methyl ethyl ketone and 20 parts butyl acetate are mixed and heated to boiling under reflux while passing nitrogen. Over a period of 3 hours a solution of 25 parts of the substituted alpha-methylstyrene prepared according to Example 90, 20 parts methyl methacrylate, 15 parts styrene, 40 parts butyl acrylate and 20 parts butyl acetate is added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 92

A mixture of 100 parts of the resin solution obtained according to Example 91, 8 parts Epotuf EP 139 and 0.5 parts 1,8-diazabicyclo-(5,4,0)-undec-7-ene is homogenised by stirring. The clear light-yellow solution formed is stable for several weeks at room temperature and displays no increase in viscosity. When this solution is heated at temperatures above 140° C. insoluble and infusible networks are formed.

EXAMPLE 93

A solution of 12 parts hydroxypropyl urethane in 25 parts methylglycol acetate is added dropwise over one hour to a solution of 20.1 parts m-TMI (a product of American Cyanamid Company, USA), 0.5 parts DABCO and 50 parts methylglycol acetate. The mixture obtained is then stirred for 2 hours at 80° C. The solvent is then removed from the reaction mixture in vacuo (thin film evaporator, 80° C., ca. 0.01 mbar). The hydroxyurethane derivative of alpha-methylstyrene $CH_2=C(CH_3)C_6H_4C(CH_3)_2NHCOOCH(CH_3)C-H_2OCONH_2$ remains as a residue.

EXAMPLE 94

20 parts methyl ethyl ketone and 20 parts butyl acetate are mixed and heated to boiling under reflux while passing nitrogen. Over a period of 3 hours a solution of 25 parts of the substituted alpha-methylstyrene prepared according to Example 93, 20 parts methyl methacrylate, 15 parts styrene, 40 parts butyl acrylate and 20 parts butyl acetate are added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 95

A mixture of 100 parts of the resin solution obtained according to Example 94, 7 parts Epotuf EP 139 and 0.5 parts 1,8-diazabicyclo-(5,4,0)-undec-7-ene is homogenised by stirring. The clear light-yellow solution formed is stable for several weeks at room temperature and displays no increase in viscosity. While this solution is heated at temperatures above 140° C. insoluble and infusible networks are formed.

EXAMPLE 96

The urethane-ethyl methacrylate $CH_2=C(CH_3)COOCH_2CH_2OCONH_2$ is obtained from methacryloyl chloride and N-hydroxyethyl urethane, $HOCH_2CH_2OCONH_2$, after V V Mikheev et al., Izv. Vyssh. Uchebn. Zaved., Khim. Khim. Tekhnol., 31 (1988) 42.

20 parts of methyl ethyl ketone and 20 parts butyl acetate are mixed and heated to boiling under reflux while passing nitrogen. Over a period of 3 hours a solution of 20 parts of the urethane-ethyl methacrylate prepared, $CH_2=C(CH_3)COOCH_2CH_2OCONH_2$, 15 parts glycidyl methacrylate, 15 parts methyl methacrylate, 20 parts styrene, 30 parts butyl acrylate and 20 parts butyl acetate is added dropwise to the boiling mixture.

At the same time a solution of 1.5 parts Trigonox C and 20 parts butyl acetate is added dropwise to the boiling reaction mixture from a second dropping vessel.

After completion of the addition of the monomer mixture and the initiator, the polymer mixture is kept at the boil for half an hour and then treated dropwise for half an hour with a solution of 0.5 parts Trigonox C and 20 parts butyl acetate. The resin solution obtained is heated under reflux for a further hour and then cooled.

EXAMPLE 97

A mixture of 100 parts of the resin solution obtained according to Example 96 and 0.5 parts 1,8-diazabicyclo-(5,4,0)-undec-7-ene is homogenised by stirring. The clear light-yellow solution formed is stable for several weeks at room temperature and displays no increase in viscosity. When this solution is heated at temperatures above 140° C. insoluble and infusible networks are formed.

EXAMPLE 98

A mixture of 5.3 parts Epiclon 725, 2.2 parts hydroxyethylcarbamate, 7.3 parts methylglycol acetate and 0.18 parts 1,8-diazabicyclo-(5,4,0)-undec-7-ene is homogenised by stirring. The clear colourless solution formed is stable for several weeks at room temperature and displays no increase in viscosity. When this solution is heated at temperatures above 120° C. insoluble and infusible networks are formed.

EXAMPLE 99

A mixture of 11.4 parts Epotuf VN 6394, 1.5 parts hydroxyethyl carbamate, 2.5 parts water and 0.15 parts 1,8-diazabicyclo-(5,4,0)-undec-7-ene is homogenised by stirring. The emulsion formed displays no increase in viscosity and is stable for several weeks at room temperature. When this emulsion is heated at temperatures above 120° C. insoluble and infusible networks are formed.

EXAMPLE 100-197

The thermosetting reactive resin mixtures according to the above examples are applied to degreased steel plates using a spiral doctor and stoved after a short period of airing (ca. 5-10 min). In all cases elastic and solvent-resistant lacquers are formed.

The stoving conditions and the Konig pendulum hardness values measured are shown in Table 1.

TABLE 1

| Example | Resin Mixture as per Example | Stoving Conditions Temp. (°C.) | Time (min) | Pend. Hardness (s) |
|---|---|---|---|---|
| 100 | 1 | 170 | 45 | 196 |
| 100 | 2 | 170 | 30 | 136 |
| 102 | 3 | 130 | 30 | 224 |
| 103 | 4 | 140 | 30 | 228 |
| 104 | 5 | 120 | YR | 188 |
| 105 | 6 | 120 | 30 | 192 |
| 106 | 7 | 180 | 20 | 178 |
| 107 | 8 | 140 | 20 | 193 |
| 108 | 9 | 140 | 30 | 184 |
| 109 | 10 | 160 | 30 | 133 |
| 110 | 11 | 160 | 30 | 195 |
| 111 | 12 | 160 | 30 | 188 |
| 112 | 13 | 180 | 20 | 164 |
| 113 | 14 | 120 | 30 | 215 |
| 114 | 15 | 180 | 30 | 146 |
| 115 | 16 | 140 | 30 | 148 |
| 116 | 17 | 140 | 30 | 139 |
| 117 | 18 | 200 | 10 | 211 |
| 118 | 18 | 160 | 30 | 214 |
| 119 | 18 | 140 | 30 | 215 |
| 120 | 18 | 140 | 60 | 216 |
| 121 | 19 | 140 | 30 | 214 |
| 122 | 19 | 160 | 30 | 214 |
| 123 | 20 | 140 | 30 | 176 |
| 124 | 21 | 160 | 30 | 232 |
| 125 | 22 | 160 | 30 | 220 |
| 126 | 23 | 160 | 30 | 165 |
| 127 | 24 | 160 | 30 | 170 |
| 128 | 25 | 160 | 30 | 165 |
| 129 | 26 | 140 | 30 | 182 |
| 130 | 26 | 160 | 30 | 202 |
| 131 | 27 | 140 | 30 | 186 |
| 132 | 27 | 160 | 30 | 196 |
| 133 | 28 | 120 | 45 | 214 |
| 134 | 28 | 140 | 30 | 182 |
| 135 | 28 | 160 | 30 | 186 |
| 136 | 31 | 160 | 30 | 182 |
| 137 | 32 | 160 | 30 | 231 |
| 138 | 33 | 160 | 30 | 169 |
| 139 | 34 | 160 | 30 | 196 |
| 140 | 34 | 180 | 30 | 179 |
| 141 | 34 | 200 | 20 | 182 |
| 142 | 34 | 220 | 10 | 186 |
| 143 | 35 | 160 | 30 | 187 |
| 144 | 35 | 180 | 30 | 174 |
| 145 | 36 | 160 | 30 | 202 |
| 146 | 36 | 180 | 30 | 183 |
| 147 | 37 | 160 | 30 | 130 |
| 148 | 38 | 160 | 30 | 133 |
| 149 | 39 | 140 | 30 | 191 |
| 150 | 39 | 160 | 30 | 195 |
| 151 | 40 | 140 | 30 | 155 |
| 152 | 40 | 160 | 30 | 173 |
| 153 | 41 | 120 | 30 | 159 |
| 154 | 41 | 140 | 30 | 179 |
| 155 | 42 | 120 | 30 | 189 |
| 156 | 42 | 140 | 30 | 182 |
| 157 | 43 | 180 | 45 | 168 |
| 158 | 44 | 160 | 30 | 186 |
| 159 | 45 | 180 | 60 | 144 |
| 160 | 46 | 160 | 45 | 158 |
| 161 | 47 | 160 | 30 | 213 |
| 162 | 47 | 180 | 30 | 211 |
| 163 | 48 | 160 | 30 | 210 |
| 164 | 49 | 140 | 30 | 204 |
| 165 | 49 | 160 | 30 | 207 |
| 166 | 50 | 160 | 45 | 152 |
| 167 | 51 | 160 | 45 | 143 |
| 168 | 52 | 180 | 45 | 136 |
| 169 | 53 | 180 | 45 | 151 |
| 170 | 54 | 160 | 30 | 144 |
| 171 | 55 | 140 | 30 | 189 |
| 172 | 56 | 140 | 30 | 194 |
| 173 | 57 | 160 | 30 | 153 |
| 174 | 58 | 180 | 30 | 176 |
| 175 | 59 | 160 | 30 | 182 |
| 176 | 60 | 180 | 30 | 164 |
| 177 | 61 | 160 | 30 | 127 |
| 178 | 62 | 160 | 30 | 139 |
| 179 | 63 | 140 | 30 | 145 |
| 180 | 64 | 140 | 30 | 133 |
| 181 | 65 | 140 | 30 | 178 |
| 182 | 66 | 140 | 30 | 168 |
| 183 | 67 | 140 | 30 | 189 |
| 184 | 68 | 140 | 30 | 161 |
| 185 | 69 | 140 | 30 | 147 |
| 186 | 70 | 180 | 45 | 174 |
| 187 | 73 | 160 | 30 | 146 |
| 188 | 76 | 160 | 30 | 152 |
| 189 | 79 | 160 | 30 | 168 |
| 190 | 81 | 160 | 30 | 165 |
| 191 | 83 | 160 | 30 | 141 |
| 192 | 86 | 160 | 30 | 128 |
| 193 | 89 | 160 | 30 | 147 |
| 194 | 92 | 160 | 30 | 152 |
| 195 | 95 | 160 | 30 | 157 |
| 196 | 97 | 160 | 30 | 132 |
| 197 | 99 | 140 | 60 | 188 |

What is claimed is:

1. A thermosetting reactive resin mixture comprising
   (a) at least one organic compound, which possesses at least two epoxide groups,
   (b) at least one carbamate compound of the general formula I,

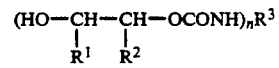

$$(HO\text{—}CH\text{—}CH\text{—}OCONH)_n R^3 \qquad I$$
$$\phantom{(HO\text{—}}R^1 \phantom{\text{—}CH\text{—}}R^2$$

wherein
$R^1$, $R^2$ mean a hydrogen atom or a methyl group,
$R^3$ means a hydrogen atom, a methyl group or a di- or trivalent aliphatic, cycloaliphatic, aromatic or heterocyclic residue with at most 20 carbon atoms,
n means 1, 2 or 3,
and said at least two epoxide groups of the organic compound react with the urethane group of formula I,
   (c) at least one basic catalyst, and with or without
   (d) other processing aids and/or additives.

2. A thermosetting reactive resin mixture comprising
   (a) at least one organic compound, which possesses at least two epoxide groups,
   (b) at least one carbamate compound of the general formula II,

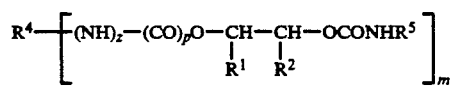

$$R^4\text{—}\left[(NH)_z\text{—}(CO)_p\text{—}O\text{—}CH\text{—}CH\text{—}OCONHR^5\right]_m \qquad II$$
$$\phantom{R^4\text{—}\left[(NH)_z\text{—}(CO)_p\text{—}O\text{—}\right.}R^1 \phantom{\text{—}CH\text{—}}R^2$$

wherein
$R^1$, $R^2$, $R^5$ mean a hydrogen atom or a methyl group,
$R^4$ means a hydrogen atom, a mono-, di-, tri- or tetravalent aliphatic, cycloaliphatic, aromatic or heterocyclic residue with at most 20 carbon atoms,
p means 0 or 1,
z means 0 or 1, provided that p is greater than or equal to z,
m means 1, 2, 3 or 4, and said at least two epoxide groups of the organic compound react with the urethane group of formula II, (c) at least one basic catalyst, and with or without (d) other processing aids and/or additives.

3. A thermosetting reactive resin mixture according to claim 1 or 2, wherein the carbamate compound correspondingly to (b) is reaction product from the treatment of 2-oxo-1,3-dioxolanes with gaseous or dissolved ammonia.

4. A thermosetting reactive resin mixture according to claim 3, wherein the reaction product from the treatment of 2-oxo-1,3-dioxolanes with gaseous or dissolved ammonia is $HOCH_2CH_2OCONH_2$, $HOCO(CH_3)CH_2OCONH_2$, $HOCH_2CH(CH_3)OCONH_2$, $C_6H_5OCH_2CH(CH_2OH)OCONH_2$, $C_6H_5OCH_2CH(OH)CH_2OCONH_2$, or mixture of the said compounds.

5. A thermosetting reactive resin mixture according to one of claim 1 or claim 2, wherein the epoxide compound corresponding to (a) is (1) Glycidyl ethers of polyfunctional aliphatic alcohols, (2) Glycidyl ethers of bi- or polyfunctional phenols, (3) Glycidyl esters of polyfunctional carboxylic acids, (4) Aliphatic or cycloaliphatic epoxides, (5) Homo- or copolymers of epoxide-containing monomers, (6) Triglycidyl isocyanurate or polyglycidyl isocyanurate, (7) Di- or triglycidyl ethers of oligomeric di- or triols, (8) Aromatic glycidylamine derivatives, or mixtures of two or more of the aforesaid compounds.

6. A thermosetting reactive resin mixture according to one of claim 1 or claim 2, wherein the components (a) and (b) are present in the epoxide:carbamate mole ratio between 20:1 and 1:20.

7. A thermosetting reactive resin mixture according to claim 1, wherein the mixture is present dissolved or emulsified in a solvent or in a solvent mixture.

8. A thermosetting reactive resin mixture according to claim 7, wherein aliphatic, cycloaliphatic or aromatic hydrocarbons, esters, ethers, glycol monoethers, amides, alcohols, sulphones, sulphoxides or mixtures of compounds of the aforesaid classes is used as solvent.

9. A thermosetting reactive resin mixture according to claim 7 or 8, wherein the solution of the thermosetting reactive resin has a solids content between 20 and 99 wt %.

10. A thermosetting reactive resin mixture according to one of claim 1 or claim 2, wherein the thermosetting reactive resin mixture is present a) completely dissolved, b) completely emulsified, or c) partly dissolved and partly emulsified in water.

11. A thermosetting reactive resin mixture according to one of claim 1 or claim 2, wherein the reactive resin mixture, present in solid form and processable, possesses a melting point or softening range of over 60° C.

12. A thermosetting reactive resin mixture according to claim 1, wherein aliphatic, cycloaliphatic, arylaliphatic, aromatic or heterocyclic tertiary amines, quaternary salts thereof or salts, hydroxides or alcoholates of the alkali metals, amidines, guanidines, tertiary phosphanes or mixtures of several compounds of the aforesaid substance classes is used as basic catalyst.

13. A thermosetting reactive resin mixture according to claim 12, wherein 1,4-diazabicyclo-(2,2,2)-octane, 1,5-diazabicyclo-(4,3,0)-non-5-ene, 1,8-diazabicyclo-(5,4,0)-undec-7-ene, 1,1,3,3-tetramethylguanidine, imidazole, 1-methylimidazole, 2-methylimidazole, 2-ethyl-4-methylimidazole, 4-(dimethylamino)-pyridine, benzyltrimethylammonium hydroxide, tetramethylammonium hydroxide, choline, tetrabutylammonium fluoride, benzyltriethylammonium chloride, tetraethylammonium bromide, triphenylphosphane, tritolylphosphane or mixtures of several of the aforesaid compound is used as catalyst.

14. A thermosetting reactive mixture according to claim 1, wherein said other processing aids and/or additives do not take part in crosslinking.

15. A thermosetting reactive mixture according to claim 2, wherein said other processing aids and/or additives do not take part in crosslinking.

16. A thermosetting reactive mixture according to claim 1, wherein said epoxide groups are crosslinked with said carbamate compound.

17. A thermosetting reactive mixture according to claim 2, wherein said epoxide groups are crosslinked with said carbamate compound.

18. A thermosetting reactive mixture according to claim 6, wherein the components (a) and (b) are present in the epoxide:carbamate mole ratio between 5:1 and 1:5.

19. A thermosetting reactive mixture according to claim 2, wherein the components (a) and (b) are present in the epoxide:carbamate mole ratio between 5:1 and 1:5.

20. A thermosetting reactive mixture according to claim 6, wherein the components (a) and (b) are present in the epoxide:carbamate mole ratio between 2:1 and 1:2.

21. A thermosetting reactive mixture according to claim 9, wherein the solution of the reactive resin has a solid content between 20 and 98 wt. %.

22. A thermosetting reactive mixture according to claim 9, wherein the solution of the reactive resins has a solids content between 60 and 95 wt. %.

23. A thermosetting reactive resin mixture according to one of claim 1 or claim 2, wherein the epoxide compound corresponding to (a) is an epoxy resin based on Bisphenol A, F or S.

* * * * *